US012811435B2

(12) United States Patent
Poon

(10) Patent No.: US 12,811,435 B2
(45) Date of Patent: Nov. 24, 2026

(54) ANTENNA EXTENDER

(71) Applicant: IDEX BIOMETRICS ASA, Oslo (NO)

(72) Inventor: Tuck Weng Poon, Hampshire (GB)

(73) Assignee: IDEX Biometrics ASA, Oslo (NO)

( * ) Notice: Subject to any disclaimer, the term of this patent is extended or adjusted under 35 U.S.C. 154(b) by 246 days.

(21) Appl. No.: 18/721,929

(22) PCT Filed: Jan. 3, 2023

(86) PCT No.: PCT/EP2023/050074
§ 371 (c)(1),
(2) Date: Jun. 20, 2024

(87) PCT Pub. No.: WO2023/131609
PCT Pub. Date: Jul. 13, 2023

(65) Prior Publication Data
US 2025/0062640 A1 Feb. 20, 2025

Related U.S. Application Data

(60) Provisional application No. 63/296,263, filed on Jan. 4, 2022.

(51) Int. Cl.
*H04B 5/26* (2024.01)
*H02J 50/00* (2016.01)
*H02J 50/10* (2016.01)
*H02J 50/90* (2016.01)

(52) U.S. Cl.
CPC .......... *H02J 50/001* (2020.01); *H02J 50/005* (2020.01); *H02J 50/10* (2016.02); *H02J 50/90* (2016.02)

(58) Field of Classification Search
None
See application file for complete search history.

(56) References Cited

U.S. PATENT DOCUMENTS 7,064,716 B2 * 6/2006 Deguchi ............ G06K 7/10336 343/702
7,395,975 B2 * 7/2008 Ito ............................ H01Q 9/42 235/492
7,581,678 B2 * 9/2009 Narendra ......... G06K 19/06206 235/449
8,286,873 B2 * 10/2012 Ryu ................. G06K 19/07749 235/492
(Continued)

FOREIGN PATENT DOCUMENTS

CN 101577740 A 11/2009
JP 2014120936 A 6/2014

OTHER PUBLICATIONS

WO 2013042604, Kato et al, Electronic Equipment, Mar. 28, 2013, Whole document, English translation.*
(Continued)

*Primary Examiner* — Tuan A Tran
(74) *Attorney, Agent, or Firm* — Smith Tempel Blaha LLC/IDEX Biometrics; Michael J. Tempel

(57) ABSTRACT

An antenna extender includes a body having a supporting structure configured to receive a smart card, a first antenna electrically connected to a second antenna, the first antenna configured to inductively couple with a near field communication (NFC) antenna on a host device, the second antenna configured to inductively couple with an NFC antenna on the smart card.

12 Claims, 16 Drawing Sheets

(56) References Cited

U.S. PATENT DOCUMENTS

| | | | | |
|---|---|---|---|---|
| 8,643,473 | B2 * | 2/2014 | Suzuki | H01Q 1/2216 340/10.3 |
| 8,766,484 | B2 * | 7/2014 | Baarman | H01F 38/14 307/104 |
| 9,000,925 | B2 * | 4/2015 | Forster | G06K 19/07749 340/568.1 |
| 9,304,555 | B2 * | 4/2016 | Jain | G06Q 20/352 |
| 9,590,305 | B2 * | 3/2017 | Florek | H01Q 1/2225 |
| 9,836,684 | B2 * | 12/2017 | Finn | G06K 19/07788 |
| 10,326,498 | B2 * | 6/2019 | Endo | G06F 13/4068 |
| 10,418,711 | B2 * | 9/2019 | Geist | G06K 19/0726 |
| 11,710,989 | B2 * | 7/2023 | Thompson | H02J 50/005 320/108 |
| 12,046,916 | B2 * | 7/2024 | Rule | H02J 50/20 |
| 2008/0218345 | A1 * | 9/2008 | Nitzan | G06K 19/0775 340/572.1 |
| 2010/0267419 | A1 * | 10/2010 | Nishizawa | G06K 19/07 455/558 |
| 2012/0276963 | A1 | 11/2012 | Narendra et al. | |
| 2019/0317564 | A1 * | 10/2019 | Hamann | G06F 1/1628 |
| 2021/0034834 | A1 * | 2/2021 | Mackin | G07F 7/086 |

OTHER PUBLICATIONS

Partial International Search Report and Written Opinion—PCT/EP2023/050074—ISA/EP—Mar. 23, 2023.

* cited by examiner

ANTENNA EXTENDER

BACKGROUND

Remote biometric user authentication is becoming more and more ubiquitous as a way of verifying a user's identity and securely requesting the authorization of transactions initiated by that user and for other actions. Biometric authentication for example, fingerprint matching, can be performed using an electronic device in the user's possession e.g., a smart card. In this example, a user's identity may be verified by comparing a fingerprint sample provided by the user to a trusted biometric template of that user. A trusted biometric template may be created by, for example, obtaining and storing one or more trusted samples of a user's fingerprint (or portions of a fingerprint) in a trusted template. Subsequent fingerprint samples are compared against the trusted template to authenticate the user. The trusted template may also be referred to as a trusted biometric template or a verification template.

A biometric smart card may have circuitry that uses harvested power to operate. For example, a non-contact smart card may harvest energy from a power source via an inductive field having very short distance capacity. Near Field Communication (NFC) is one example of such a technology. The card typically must be placed in close proximity to the device generating the field, sometimes referred to as casual-proximity. The device generating the field may be a point of sale (POS) terminal, a smart phone, or another device, sometimes referred to as a host device or an NFC terminal. The close proximity requirement and capability were developed to provide a convenient mechanism for users to casually tap their smart cards against the device generating the field to use its capability to perform a transaction or to gain physical access. Completion of the event can often happen in less than one second, at which time the user may remove the card from it close-proximity position with the NFC terminal.

However, some use cases, such as biometric enrollment and information encryption and decryption, typically take longer than the above-mentioned transactions and typically require consistent energy for a longer period of time than what is typically expected using casual-proximity to the NFC terminal. Moreover, use for any persistent communication task (for example, step up authentication or other multiple communication tasks, extra security, etc.) may also require longer periods of time during which power must be provided to the smart card.

One type of host device that provides temporary power to the smart card is a smart phone having NFC capability. Using a smart phone having NFC capability to power the smart card typically requires the user to precisely align the smart card with an antenna on the smart phone. However, depending on the location and size of the antenna on the smart phone, it may prove difficult to align the antenna on the smart card to the antenna on the smart phone with sufficient precision and for a sufficiently long period of time to complete some of the desired tasks that require NFC power. Therefore, a way to improve power transfer from a smart phone (or another NFC device) to a smart card is desired.

SUMMARY

In an exemplary embodiment, an antenna extender includes a body having a supporting structure configured to receive a smart card, a first antenna electrically connected to a second antenna, the first antenna configured to inductively couple with a near field communication (NFC) antenna on a host device, the second antenna configured to inductively couple with an NFC antenna on the smart card.

In another exemplary embodiment, a method for improving power transfer between a smart card and a host device includes aligning a first antenna on a first side of an antenna extender in proximity to a host NFC antenna on a host device, aligning a second antenna on a second side of the antenna extender in proximity to an antenna on a smart card, and maximizing power transfer from the host device to the smart card through the antenna extender.

In another exemplary embodiment, a device for improving power transfer between a smart card and a host device includes means for aligning a first antenna on a first side of an antenna extender in proximity to a host NFC antenna on a host device, means for aligning a second antenna on a second side of the antenna extender in proximity to an antenna on a smart card, and means for maximizing power transfer from the host device to the smart card through the antenna extender.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

Exemplary embodiments can be better understood with reference to the following drawings. The components in the drawings are not necessarily to scale, emphasis instead being placed upon clearly illustrating the principles of the present invention.

DETAILED DESCRIPTION

Figure 1:
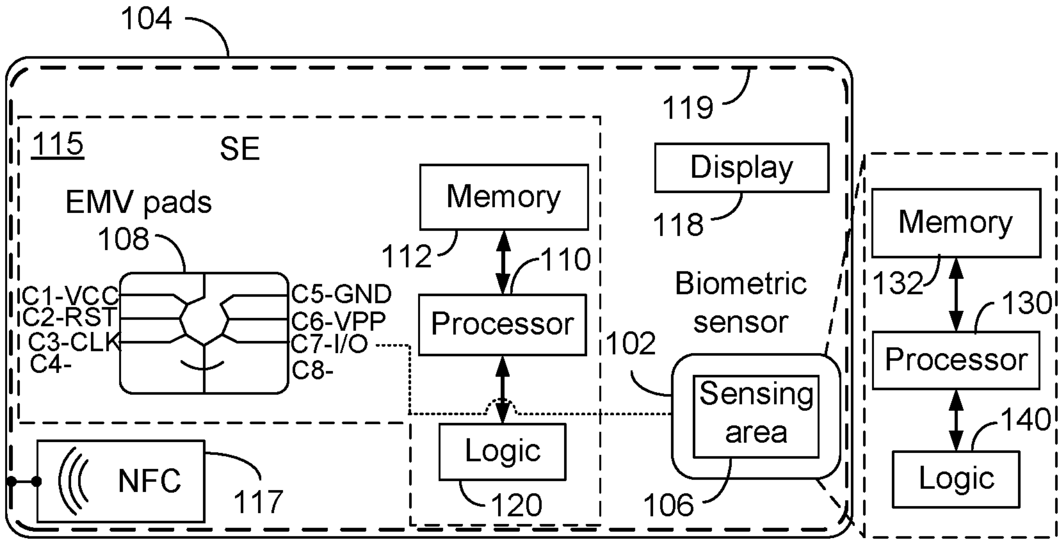
FIG. 1 illustrates a biometric sensor assembly or a biometric sensor, such as fingerprint sensor, instantiated on a smart card according to some embodiments.

While aspects of the subject matter of the present application may be embodied in a variety of forms, the following description and accompanying drawings are merely intended to disclose some of these forms as specific examples of the subject matter. Accordingly, the subject matter of this application is not intended to be limited to the forms or embodiments so described and illustrated.

Unless defined otherwise, all terms of art, notations and other technical terms or terminology used herein have the same meaning as is commonly understood by one of ordinary skill in the art to which this application belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the application and are not intended to be limiting.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

As used herein, the terms "optional" and "optionally" mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

Biometric Identity Authentication or Verification

There are currently a number of ways to verify that a person is who they claim to be; for example, comparing a feature that is unique to a person to a pre-existing version of that feature that may be subject to counterfeit. For example, matching a newly generated handwriting signature to a handwriting signature on file is one traditional way of verifying a person's identity, but it is subject to forgery. As another example, matching a person's face to a photograph on their official identification card is another well accepted form of biometric identity authentication. These matching techniques (identity verification and authentication techniques) are useful, but these tests can be circumvented.

A user's fingerprint is a unique biometric identifier (or feature) of that user. For example, fingerprints have been used by law enforcement and immigration authorities for some time, but the expense of collecting, archiving and matching fingerprints have traditionally been costly and impractical. Digital technologies have simplified the capture of an image of a fingerprint. For example, an image of a fingerprint can be captured, encoded and stored electronically so that key identification features of the user can be associated with this particular fingerprint image. Then a new fingerprint (image, sample) can be captured, and compared with the previously stored fingerprint image and a statistical estimate can be made corresponding to the likelihood that the new fingerprint is a sufficient match with the previously collected fingerprint sample(s).

A fingerprint is one of many modalities that may be useful for biometric authentication. Other biometric modalities exist, such as two dimensional (2D) and three dimensional (3D) facial recognition, palm recognition, iris recognition, gait recognition, voice recognition, etc. Different biometric modalities offer different experiences for the user and different metrics for confidence of a match. However, attempting to maintain the biometric identifier or feature as confidential is not practical.

Biometric Smart Card

A modern smart card may incorporate a biometric sensor capable of obtaining, processing, analyzing, and storing a biometric sample. A biometric sensor and processing circuitry on a modern smart card may be configured to operate on power provided to the smart card by an external power source, or by a power source on the smart card. For example, a contact-enabled smart card may obtain power from a reader terminal, an enrollment sleeve, or another power source. A non-contact enabled smart card may obtain power from a reader terminal, a smart phone, or another power source using, for example, near field communication (NFC) or other wireless technology.

A device without a graphic display such as a biometrically enabled smart card presents a much greater challenge to creating a comprehensive trusted template than devices with display capability such as smartphones. Such a card could be electronically or wirelessly connected to a host device with a native display to perform an equivalent interactive enroll process. The drawback is that this is often a complicated process that is user unfriendly and could create a security vulnerability by breaching data security during the card/host communications link.

It is common to see biometric sensors, such as, for example, fingerprint sensors, or other biometric sensors configured to capture one or more of image data, audio data, ultrasonic data, electric field data, and other data installed on human interface devices such as smartphones, laptops, tablets, or other devices. For example, a fingerprint sensor installed on a smart phone can be used to verify the identity of the user. The fingerprint sensor can also be used as a data entry or a control mechanism for the smart phone. For example, the fingerprint sensor can detect the presence of a single finger touch and be programmed to activate a smart phone function or application upon detection.

As fingerprint sensors gain in implementation and user acceptance, fingerprint sensors are now finding use in numerous other devices such as, for example, smart cards, fitness monitors or trackers, wearable devices, domestic and industrial appliances, automotive components, and internet of things (IOT) devices. Some devices, such as smart cards and IOT devices, have limited or no user interfaces or status indicators such as screens, speakers, light emitting diodes (LEDs), or audio signals with which the device may impart information to the user. Such devices may also have limited or no user input mechanisms for receiving user input due to lack of a keyboard, switches, buttons, or levers.

Non-contact smart card systems harvest energy using an inductive field with very short distance capacity, the card is typically placed in close-proximity to the device or terminal generating the field. "Close-proximity" as used herein refers to a smart card being accurately placed near a host device within a few centimeters. The power used to create the NFC field is generated by the device or terminal. The smart card harvests energy from the field to provide power for circuitry on the smartcard.

A proximity of a few centimeters is typically required between the NFC terminal and the NFC smart card to operate properly, too far away and the field strength will be too weak, the smart card's energy requirement will not be met, and it will not operate.

Close proximity requirements and capability were developed to provide a convenient mechanism for users to casually tap their smart cards to use its capability to perform a transaction or to gain physical access. However, when the smart card and terminal are in close-proximity, the energy available to the smart card may vary due to relative positioning of the smart card and the terminal antenna. Casual NFC proximity, e.g. tapping a payment terminal with your smart card, typically provides energy, over enough time, to complete a typical information exchange.

Casual-proximity typically also provides enough energy for many other value added smart card functions such as displays, indicators and biometric sensor verification.

A smart card guiding mechanism is common when using an input/output (I/O) interface such as EMV (Europay, MasterCard, Visa) as a smart card terminal to assure that the contacts on the EMV terminal and pads on the smart card align to make proper electrical connection. That mechanism is missing in systems that use inductive coupling because casual proximity does not require precise alignment. A measure of the energy-carrying capacity of such an inductive coupling shows high variation using casual proximity, as is currently in common practices. Often, to compensate for a limited energy budget, additional components are added to the smart card such as batteries or capacitors.

A security related application executing on an NFC contactless smart card may require having a consistent energy transfer to reduce exposure to attackers and to maintain isolation while executing critical operations. Examples of a security related applications include biometric enrollment and biometric verification.

Maintaining a persistent connection between a smart phone and a smart card would enable a security related application executing on the smart phone to use features of the smart card, for example biometric verification, to add security which is separate and independent from the security services provides by the smart phone operating system and hardware.

Completion of some tasks that use NFC harvested power, such as a transaction authorization, can often happen in less than one second, at which time the user may remove the card from it close-proximity position. However, some use cases, such as biometric enrollment and information encryption and decryption, typically take longer and require more consistent energy transfer than can be expected by casual-proximity between the NFC terminal and the smart card. For example, certain operations on the smart card such as biometric enrollment often take an extended period of time in comparison to a typical transaction. It is often challenging for a typical user to manually position the smart card in correct proximity accurately for the extended period, causing variations in the field strength that limit the energy available to the smart card.

To assure a strong NFC field, an apparatus to align the smart card with the terminal is desirable to provide an NFC field that is consistent in strength to provide the smart card with adequate energy during operations that may require a higher energy requirement.

In order for a biometric sensor, such as, for example, a fingerprint sensor, to function as a user verification device, a sufficiently detailed template (or multiple templates) of a user's biometric data (e.g., fingerprint) must be captured and stored during an enrollment process, as known to those having ordinary skill in the art. The stored template (i.e., a trusted template, a trusted biometric template, or a verification template, of biometric data (e.g., a fingerprint image)) is used to compare with biometric image data generated by the biometric sensor (e.g., an image of a finger, or one or more portions of a finger, sensed by the fingerprint sensor, sometimes referred to as a "live sensed image", a "live fingerprint sample", a "live image sample" or a "live image") when the device is in subsequent general use, as known to those having ordinary skill in the art. In an embodiment employing a fingerprint sensor as the biometric sensor, a user is permitted to access the functionality of the device, or use the smart card for a transaction, if the live sensed image of the finger matches the stored trusted template. Accordingly, it is desirable to acquire and store a trusted template of sufficient scope and quality during a biometric enrollment process to enable verification that a subsequent biometric sample belongs to the user. If the stored trusted template is not of sufficient scope and quality, the user may experience false acceptance or rejection of the verification attempt at an unacceptable rate.

In the context of the present application, a "sensor element" comprises an arrangement of one or more components configured to produce a signal based on a measurable parameter (e.g., capacitance, light/optics, heat/thermal, pressure, etc.), characteristics of which will vary based on the presence or absence of an object that is in local proximity to the sensor element. For example, a capacitive fingerprint sensor will comprise an array of such sensor elements configured to produce an electrical signal proportional to the impedance of the surface of a finger placed on or near the fingerprint sensor. The sensitivity of each of the sensor elements of the fingerprint sensor is such that characteristics of the signal produced at each sensor element will vary based on surface characteristics, such as ridge patterns of the portion of a finger placed on or near the array, and the varying characteristics of signals produced at each sensor element may be combined or otherwise processed to form a data file that is a biometric representation of the finger surface placed on or near the array. Specific examples of such sensor elements may include, but are not restricted to, capacitive, ultrasonic, optical, thermal, and pressure sensor elements.

In addition, sensor elements contemplated herein include both silicon-based sensors in which sensor elements are formed directly on a silicon semiconductor substrate and may form a 2-dimensional array of sensing pixels and off-silicon sensors in which sensor elements are not disposed directly on a silicon semiconductor substrate (e.g., so-called off-chip sensors) but formed on a non-silicon substrate and are conductively connected to a remotely-located control element, which may be a silicon-based semiconductor chip, such as an application specific integrated circuit (ASIC).

While aspects of this application are presented in the context of specific types of sensor elements and fingerprint sensor configurations, it should be appreciated that implementations of those aspects are not necessarily limited to a specific type of sensor element of the fingerprint sensors described herein.

As used herein, the terms "authentication" and "identity authentication" refer to the function of confirming the identity of a user requesting the initiation of a transaction. Identity authentication generally refers to verifying in real time that a user is who they claim to be for the purposes of initiating a transaction and generating a signal corresponding with matching a presented biometric to a reference.

As used herein, the term "verification" refers to at least part of an authentication process involving comparing a new biometric sample to a trusted biometric sample that may be part of a trusted template, which may also be referred to as a verification template, using a matching algorithm. Verification may result in determining a positive correlation of features in the compared samples resulting from the comparison of the trusted template (having one or more previously obtained biometric features), created during an enrollment process, with a live image (having one or more current biometric features) biometric sample. A trusted template typically identifies many distinctive features that can be used for correlation with a biometric sample, while the live biometric sample may only have a few distinctive features. When a particular correlation threshold between the trusted template and the live biometric sample is achieved, the observation is considered a positive verification and an authorization signal is generated indicating that the user's identity is authenticated.

As used herein, the term "validation" refers to offering proof (e.g., signed/encrypted) during a transaction request that a biometric authentication was successful.

As used herein, the term "host device" may comprise any device that is configured to generate an NFC inductive field to transfer power to a smart card. Non-limiting examples of a host device include a POS terminal, a smart phone, or any other device capable of generating an NFC field from which a smart card may harvest power. A host device may also be referred to as an NFC terminal.

In an exemplary embodiment, an antenna extender is disclosed. Embodiments of the antenna extender may include a way to improve inductive power transfer from a host device, such as a POS terminal, a smart phone, etc., to a smart card. Improving inductive power transfer may comprise one or more of correctly positioning the smart card so as to take maximum advantage of the inductive field generated by the host device, and resonant tuning to maximize the ability of antennas to transfer power using an inductive field.

Exemplary embodiments of the antenna extender may comprise a way to improve the alignment between the smart card and the host device.

Exemplary embodiments of the antenna extender may comprise two electrically connected NFC antennas, one antenna configured to electrically and inductively couple to an NFC terminal, and another antenna configured to electrically and inductively couple to the smart card.

Exemplary embodiments of the antenna extender may comprise tuning the antennas on the antenna extender to improve the power transfer between the host device antenna on the extender and the antenna on the host device, and to improve the power transfer between the smart card antenna on the extender and the antenna on the smart card. The tuning may include resonant tuning using passive components such as one or more of resistances, capacitances and inductances.

Exemplary embodiments of the antenna extender may comprise antennas having specific shapes and orientations to maximize inductive coupling between the antenna extender and the host device and the smart card.

Exemplary embodiments of the antenna extender may comprise locating the antenna extender in a folio or a case to provide a fixed position for the host device and the smart card.

Exemplary embodiments of the antenna extender may comprise a sleeve or an insertion recess or slot for the smart card on the NFC terminal which provides NFC proximity for consistent energy transfer while an extended operation using NFC is performed.

Exemplary embodiments of the antenna extender may comprise indicia, or markings or an outline indicating proper placement of a host device and/or a smart card on the NFC terminal which provides NFC proximity for consistent energy transfer while an extended operation using NFC is performed.

Exemplary embodiments of the antenna extender may be configured to operate with metal smart cards using NFC contactless technology. For example, in the case of a metal smart card, the antenna extender may only work on one side of card.

Exemplary embodiments of the antenna extender may include one or more magnets or magnetic material to aid in locating the antenna extender on a magnet equipped host device.

Exemplary embodiments of the antenna extender may be included in or may be part of a tray or other object that can be used to locate a host device and a smart card in relation to the antenna extender.

FIG. 1 illustrates a biometric sensor assembly or a biometric sensor, such as biometric sensor 102, installed on a user device. In an exemplary embodiment, the user device may be a smart card 104 according to some embodiments and the biometric sensor 102 may be a fingerprint sensor. In other embodiments, a user device may be a device other than a smart card, such as, for example, a wearable device, a communication device, a personal computing device, a tablet, or another user device. In the illustrated embodiment shown in FIG. 1, the smart card 104 is a limited device, as described above, and the smart card 104 comprises the biometric sensor 102. In some embodiments, the smart card 104 comprises a fingerprint, or other biometric sensor 102, processor or processing circuitry 110, memory 112, a display 118, logic 120 and contact pads 108 providing contacts for an external power source. In an exemplary embodiment, the biometric sensor 102 may also comprise processor or processing circuitry 130, memory 132 and logic 140. The contact pads 108 may be any type of input/output (I/O) interface, and as an example, may be referred to as EMV (Europay, MasterCard, Visa) pads and may be used to provide a physical connection to a POS terminal, or other host device. The processing circuitry 110 and 130 may be a microprocessor, microcontroller, microcontroller unit (MCU), application-specific integrated circuit (ASIC), field-programmable gate array (FPGA), or any combination of components configured to perform and/or control the functions of the smart card 104. The memory 112 and 132 may be a read-only memory (ROM) such as EPROM or EEPROM, flash, or any other storage component capable of storing executory programs and information for use by the processing circuitry 110 and 130. The biometric sensor 102 may comprise sensor controlling circuitry and a sensor memory. The sensor controlling circuitry may be a microprocessor, microcontroller, application-specific integrated circuit (ASIC), field-programmable gate array (FPGA), or any combination of components configured to perform and/or control the functions of the biometric sensor 102. The sensor memory may be a read-only memory (ROM) such as EPROM or EEPROM, flash, or any other storage component capable of storing executory programs and information for use by the processing circuitry 110 and 130. The sensor controlling circuitry is configured to execute fingerprint sensor application programming (i.e., firmware) stored in the sensor memory 132. The memory 112 and the sensor memory 132 may be the same component. The sensor controlling circuitry is coupled to or may be part of the processing circuitry 110 and 130. The various components of the smart card 104 are appropriately coupled and the components may be used separately or in combination to perform the embodiments disclosed herein.

In an exemplary embodiment, the memory 112 may comprise logic 120 and the memory 132 may comprise logic 140. The logic 120 and 140 may comprise software, firmware, instructions, circuitry, or other devices, configured to be executed by the processing circuitry 110 and 130, respectively, to control one or more functions of the smart card 104, as described herein.

In an exemplary embodiment, the biometric sensor 102, the processor 110 and/or 130, the memory 112 and/or 132, and the logic 120 and/or the logic 140 may be configured to capture one or more submitted current biometric features corresponding to a biometric sample that may comprise one or more biometric features that form a current user identity sample provided by a user, compare the one or more current biometric sample to a previously obtained biometric sample corresponding to a previously obtained user identity sample, and if the one or more current biometric features in the biometric sample match the previously obtained biometric sample, generate an authorization signal that identifies the current user identity sample as belonging to an authorized user, the authorization signal corresponding to a user initiated successful biometric user authentication.

In another exemplary embodiment, the biometric sensor 102, the processor 110 and/or 130, the memory 112 and/or 132, and the logic 120 and/or the logic 140 may be configured to perform an enrollment process where the biometric sensor 102 collects multiple biometric samples of a user to enroll the user in the memory 112 and/or 132 of the smart card 104.

The contact pads 108 comprise one or more power transmission contacts, which may connect electrical components of the smart card 104, such as an LED, the processing circuitry 110, memory 112, display 118, sensor elements (e.g., the biometric sensor 102) etc., to an external power source. In some embodiments, the contact pads 108 further comprise one or more data transmission contacts that are distinct from the power transmission contacts which connect the smart card 104 to an external device configured to receive data from and/or transmit data to the smart card 104. In this context, the data transmission contacts of the smart card 104 are the contacts that convey data transmitted to or transmitted from the smart card 104.

In an exemplary embodiment, the display 118 may be configured to provide interactive communication with a user. For example, the display 118 may be configured to provide various information to a user. In an exemplary embodiment, the display 118 may be configured to provide signal strength information to a user as it relates to alignment of the smart card and a host device with an antenna extender as described herein. In one example, the display may comprise one or more light emitting diodes (LEDs) an alphanumeric display, a signal strength bar, or another indicator relating to NFC signal strength. Although shown in FIG. 1 as being on a front-facing surface of the smart card 104, the display 118 may also be located on an opposite (rear-facing) surface of the smart card 104.

The processing circuitry 110, the memory 112 and the logic 120 may comprise a secure element 115. The contact pads 108 may be part of the secure element 115 which includes the processing circuitry 110, memory 112, and logic 120, all of which are in electrical communication with the contact pads 108. In an exemplary embodiment, the secure element 115 may conform to an EMVCo. power management protocol commonly used on smart cards, and the contact pads 108 provide electric contacts between the smart card 104 and a host device, such as for example, a smart phone, an enrollment sleeve, a tablet computer, an external card reader, or other host device, to provide power to the processing circuitry 110 of the card and to read data from and/or write data to the memory 112. In an exemplary embodiment, a host device, such as a smart phone, a tablet, a POS terminal, or another device, may provide temporary power to the smart card 104 using, for example, NFC technology, Qi power technology, a combination of NFC and Qi power technology, or other wireless power technology, in which case the smart card 104 includes NFC element 117 or another power element. In an exemplary embodiment, an antenna 119 may be coupled to the NFC element 117 to allow the smart card 104 to harvest NFC power from a host device, such as an NFT terminal, a POS terminal, a smart phone, a tablet, or another device. Although shown as generally occupying a periphery of the smart card 104, the antenna 119 may take other shapes and configurations. The antenna 119 may comprise metal, or metallic material, and may comprise one or more loops, or may have a meandering configuration.

In some embodiments, NFC capability may be implemented on the smart card 104 using NFC communication element 117 to communicate with a host device, and in some embodiments to allow a host device to provide power, or temporary power, to the smart card 104. NFC is a standards-based wireless communication technology that allows data to be exchanged between devices that are a few centimeters apart. NFC operates at a nominal frequency of 13.56 MHz and transfers data at up to 424 Kbits/seconds. In some embodiment, the NFC element 117 may be completely or partially part of, or contained within, the secure element 115.

When used for contactless transactions, NFC-enabled smart phones incorporate smart chips (called secure elements, similar to the secure element 115 on the smart card 104) that allow the smart phone to securely store and use the transaction application and consumer account information. Contactless transactions between an NFC-enabled mobile phone and a POS terminal use the standard ISO/IEC 14443 communication protocol currently used by EMV contactless credit and debit chip cards. NFC-enabled smart phones and other devices can also be used for a wide variety of other applications including chip-enabled mobile marketing (e.g., coupons, loyalty programs and other marketing offers), identity and access, ticketing and gaming. NFC is available as standard functionality in many mobile phones and allows consumers to perform safe contactless transactions, access digital content, and connect electronic devices simply. An NFC chip in a mobile device can act as a card or a reader or both, enabling consumer devices to share information and to make secure payments quickly.

In FIG. 1, contact pads 108 embody an exemplary smart card contact arrangement, known as a pinout. In an exemplary embodiment, contact C1, VCC, connects to a power supply. contact C2, RST, connects to a device to receive a reset signal, used to reset the card's communications. Contact C3, CLK, connects to a device to receive a clock signal, from which data communications timing is derived. Contact C5, GND, connects to a ground (reference voltage). In various embodiments, contact C6, VPP, may, according to ISO/IEC 7816-3: 1997, be designated as a programming voltage, such as an input for a higher voltage to program persistent memory (e.g., EEPROM). In other embodiments, contact C6, VPP, may, according to ISO/IEC 7816-3: 2006, be designated as SPU, for either standard or proprietary use, as input and/or output. Contact C7, I/O, provides Serial input and output (half-duplex). Contacts C4 and C8, the two remaining contacts, are AUX1 and AUX2 respectively and used for USB interfaces and other uses. In an exemplary embodiment, the biometric sensor 102 may communicate with the SE 115 using serial input and output capabilities of the SE 115. In some embodiments the biometric sensor 102 may be directly connected to contact C7.

In some embodiments described herein, the contact pads 108 are only used for providing connection points via the one or more power transmission contacts, such as C1 VCC and C5 GND, to an external power source, and no data is transmitted to or from the smart card 104 during an activation or enrollment process. The smart card 104 may comprise one or more power transmission contacts for connecting the smart card 104 to a power source, without any further data transmission capability as in a secure element. In other embodiments, the location of the biometric sensor 102 may be embedded into any position on the smart card 104 such that the position of the biometric sensor 102 is substantially separated from the contact pads 108 and allows a user to place a finger on the biometric sensor 102.

A user can carry out various functions on the smart card 104 by placing a finger in various positions over a sensing area 106 of the biometric sensor 102. The sensing area 106 comprises a two-dimensional array of sensor elements. Each sensor element is a discrete sensing component which may be enabled depending on the function of the biometric sensor 102. Any combination of sensor elements in the two-dimensional array may be enabled depending on the function of the biometric sensor. While the illustrated embodiment shown in FIG. 1 describes the biometric sensor 102 in relation to the smart card 104, this is not required and the biometric sensor 102, or other biometric sensor, may be incorporated in a different limited device in other embodiments. For example, other limited devices in which aspects of the technology describe herein may be incorporated include fitness monitors, wearable devices, domestic and industrial appliances, automotive components, and "internet of things" (IOT) devices.

In some embodiments, the sensing area 106 can have different shapes including, but not limited to, a rectangle, a circle, an oval, a diamond, a rhombus, or a lozenge.

The biometric sensor 102 may comprise an array of sensor elements comprising a plurality of conductive drive lines and overlapped conductive pickup lines that are separated from the drive lines by a dielectric layer. Each drive line may thus be capacitively coupled to an overlapping pickup line through a dielectric layer. In such embodiments, the pickup lines can form one axis (e.g., X-axis) of the array, while the drive lines form another axis (e.g., Y-axis) of the array. Each location where a drive line and a pickup line overlap may form an impedance-sensitive electrode pair whereby the overlapping portions of the drive and pickup lines form opposed plates of a capacitor separated by a dielectric layer or layers. This impedance-sensitive electrode pair may be treated as a pixel (e.g., an X-Y coordinate) at which a surface feature of the proximally located object is detected. The array or grid forms a plurality of pixels that can collectively create a map of the surface features of the proximally located object. For instance, the sensor elements forming the pixels of the grid produce signals having variations corresponding to features of a fingerprint disposed over the particular sensor element and thus the pixels along with circuitry controlling the sensor elements and processing signals produced by the sensor elements that includes a processor and signal conditioning elements (i.e., "sensor controlling circuitry") that may be incorporated into an integrated circuit can map locations where there are ridge and valley features of the finger surface touching the sensor array.

Additional details of a fingerprint sensor with overlapping drive lines and pickup lines as well as the drive, sense, and scanning electronics, are discussed in U.S. Pat. No. 8,421,890, entitled "Electronic imager using an impedance sensor grid array and method of making," U.S. Pat. No. 8,866,347, entitled "Biometric sensing", and U.S. Pat. No. 9,779,280, entitled "Fingerprint Sensor Employing an Integrated Noise Rejection Structure," the respective applications of which are hereby incorporated into this document by reference in their entirety as if set forth fully herein. Further improvements and enhancements to the devices, methods, and circuitry used to improve the sensitivity of the measurement principal employing a sensor grid comprised of overlapping drive lines and pickup lines separated by a dielectric including the drive, sense, scanning, and noise reduction electronics, are described in U.S. Pat. No. 9,779,280.

An exemplary installation of a fingerprint sensor in a smart card is described in U.S. Pat. No. 9,122,901, the application of which is hereby incorporated into this document by reference in its entirety as if set forth fully herein.

The sensing area 106 of the biometric sensor, (e.g., biometric sensor 102) installed on the smart card 104 may be selectively configured to operate in five modes: (1) enrollment mode; (2) verification mode; (3) data input mode; (4) control mode; and (5) unlock mode. The user may select the different modes by different interactions with the sensor, such as a double tap, hold, up/down drag, and left/right drag on the sensor area 106. In other embodiments, the biometric sensor 102 may be selectively configured in different modes by placing a data input device over the sensing area 106. Data input devices configured for different sensor operation modes may include unique detectable features that, when detected by the sensor, will configure the sensor in a mode corresponding to the data input device.

In the context of this application, a "data input device" is any device that may be attached or otherwise coupled to a host device and is thereby coupled to a biometric sensor of the host device to enable a user to provide inputs to the host device through the biometric sensor via features of the data input device that allow the user to interface with the biometric sensor to provide control inputs or inputs of data in addition to the particular biometric data that the biometric sensor is configured to detect. For instance, in examples described herein, the data input device includes keys or buttons that are each uniquely coupled to a fingerprint sensor of the host device so that a user contacting any such key or button generates a unique control input or a unique data input corresponding to that key or button. In addition, in other examples described herein, the attachment or coupling of the data input device to the host device, or its removal, may itself provide data input to the host device, for example, communicating that the data input device has been attached or coupled to, or removed from, the host device, that the data input device has or has not been properly positioned with respect to the biometric sensor to enable proper control or data input by the user, or, as described above, to place the biometric sensor in one of a number of operating modes.

In some embodiments, when the biometric sensor 102 is in enrollment mode, all of the sensor elements in the two dimensional array of the sensing area 106 are activated in a fingerprint sensing mode to produce signals—such as capacitance—having detectible variations corresponding to fingerprint features—grooves and ridges—in detective proximity to the sensor array (i.e., in physical contact with the sensor elements or in sufficient proximity to the sensor elements to produce signals corresponding to fingerprint features) which together form an "image" of the fingerprint, and the sensor controlling circuitry is configured so that multiple images of a user's fingerprint may be gathered, and, possibly, manipulated, to acquire a sufficient fingerprint template that may be subsequently stored in memory. An exemplary enrollment process is described in commonly owned U.S. Pat. No. 9,684,813, entitled "System and Method of Biometric Enrollment and Verification," the application of which is hereby incorporated into this document by reference in its entirety as if set forth fully herein. The stored fingerprint template may be continuously updated based on the user's use of the fingerprint sensor over time.

In some embodiments, when the biometric sensor 102 is in verification mode (also known as authentication mode), all of the sensor elements in the sensing area 106 are activated in fingerprint sensing mode and the sensor controlling circuitry is configured so that an image of the user's fingerprint may be acquired and compared with the fingerprint template stored in memory to verify that the acquired fingerprint image sufficiently matches the fingerprint template. An exemplary verification process is also described in U.S. Pat. No. 9,684,813. An exemplary verification process is also described in commonly owned U.S. patent application Publication No. U.S. 2018/0144173, now U. S. Pat. No. 10,551,931 entitled "Combination of Fingerprint and Device Orientation to Enhance Security," the application of which is hereby incorporated into this document by reference in their entirety as if set forth fully herein. Ideally, in both the enrollment mode and the verification mode, a finger should be placed centrally on the sensing area 106 of the biometric sensor 102 in order to obtain the best image of the finger.

In some embodiments, when the biometric sensor 102 is in control mode and data input mode, the sensor elements in the sensing area 106 are activated in contact sensing mode, data input keys are operatively coupled to associated spatially distinct regions or control areas of the sensing area to enable direct or indirect contact by a user's finger with each associated spatially distinct area, and the sensor controlling circuitry is configured so that the user may input data through the sensing area 106 by directly or indirectly placing a finger on selected, associated spatially distinct control areas within the sensing area 106 of the biometric sensor 102. That is, as opposed to the enrollment and verification modes in which the sensor elements and the processor of the sensor controlling circuitry are configured to detect and map different biometric features of the finger surface in contact sensing mode for the control and data input modes, the sensor elements and the sensor controlling circuitry may be configured to merely detect whether or not the sensor element is directly or indirectly contacted by a finger surface and to distinguish a spatially distinct region of the sensor array in which the contacted element(s) reside.

In both the control mode and the data input mode, the sensing area 106 may be divided into spatially distinct control areas dedicated to a specific command or data input. The number and location of the spatially distinct control areas within the sensing area 106 may be configured depending on the desired use of the biometric sensor 102, the size of the sensing area 106, and the ability of the biometric sensor 102 to accurately distinguish contact by the finger with the different spatially distinct regions on the sensor. In unlock mode, the smart card 104 may remain in data input mode until the user inputs a correct unlock code, wherein the input of the correct code unlocks the smart card 104.

In some embodiments described herein, when the biometric sensor 102 is in control mode and data input mode, a first portion of the sensor elements in the sensing area 106 are activated in contact sensing mode, data input keys are operatively coupled to associated spatially distinct regions or control areas of the first portion of the sensing area to enable direct or indirect contact by a user's finger with each associated spatially distinct area, and the sensor controlling circuitry is configured so that the user may input data through the sensing area 106 by directly or indirectly placing a finger on selected, associated spatially distinct control areas within the first portion of the sensing area 106 of the biometric sensor 102. In such embodiments, when the biometric sensor 102 is in enrollment mode, only the sensor elements located within a second portion of the two-dimensional array of the sensing area 106 different from the first portion and accessible to a user's finger may be activated in the fingerprint sensing mode and the sensor controlling circuitry is configured so that multiple images of a user's fingerprint may be gathered to acquire a sufficient fingerprint template that is stored in memory.

Figure 2A:
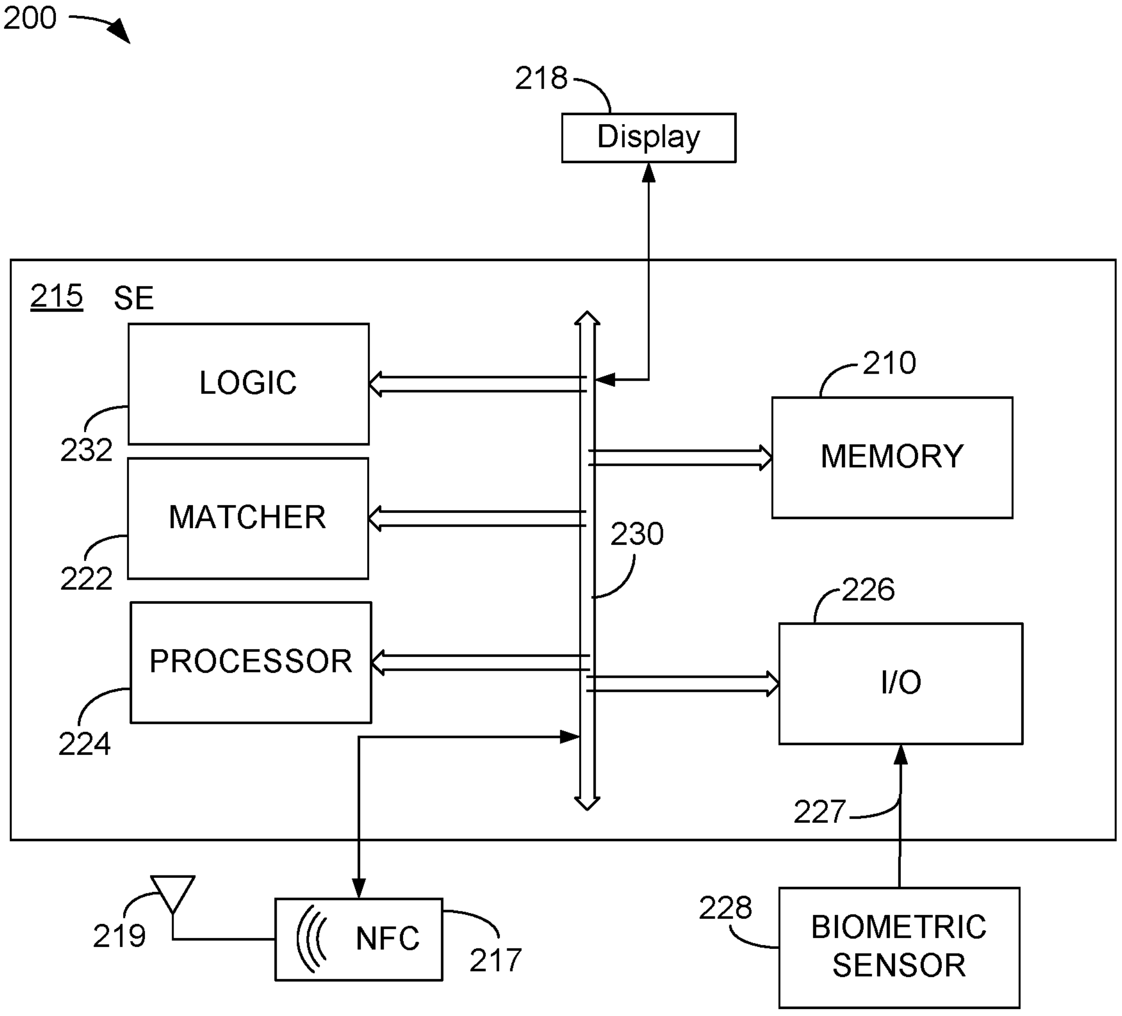
FIG. 2A illustrates a block diagram of a portion of the smart card of FIG. 1.

FIG. 2A is a block diagram 200 of a portion of the smart card of FIG. 1. In an exemplary embodiment, the portion of the smart card may comprise a secure element 215. The secure element 215 may be similar to the secure element 115 of FIG. 1. In an exemplary embodiment, the secure element 215 may comprise a processor 224, a memory 210, a matcher 222, logic 232 and an I/O element 226 operatively coupled together over a communication bus 230. A biometric sensor 228 may provide data to the I/O element 226 over connection 227. In an exemplary embodiment, the biometric sensor 228 may be a fingerprint sensor, similar to the biometric sensor 102 of FIG. 1. In an exemplary embodiment, the memory 210 may be similar to the memory 112 or the memory 132 of FIG. 1.

In an exemplary embodiment, the matcher 222 may be hardware, software, firmware, or a combination thereof, and may be configured to process samples from the biometric sensor 228 to determine whether a biometric sample provided by the biometric sensor 228 has a sufficient number of correlated features with (and/or matches or partially matches) a trusted biometric sample that may be stored in the memory 210 to allow the determination that the new or live biometric sample provided by the biometric sensor 228 belongs to the same user as does a trusted biometric sample. In some embodiments, the matching function may reside completely in the SE or parts of the matching function may reside in both an ASIC and the SE, which in some embodiments may be combined into a single element. Biometric sample matching technology is known to those having ordinary skill in the art and will not be described in detail herein.

In an exemplary embodiment, an NFC element 217 and antenna 219 may be connected to the SE 215 to allow the smart card (not shown) that is associated with the SE 215 to harvest power wirelessly. The NFC element 217 and the antenna 219 are similar to the NFC element 117 and antenna 119 described in FIG. 1.

In an exemplary embodiment, a display 218 may be connected to the SE 215 or to another processing element outside of the SE 215, to provide a display to a user. In an exemplary embodiment, the display 218 may be similar to the display 118 described in FIG. 1. In an exemplary embodiment, the processor 224 and the NFC element 217 may be configured to determine signal strength and the display 218 may be used as a signal strength indicator to display NFC signal strength to a user.

Figure 2B:
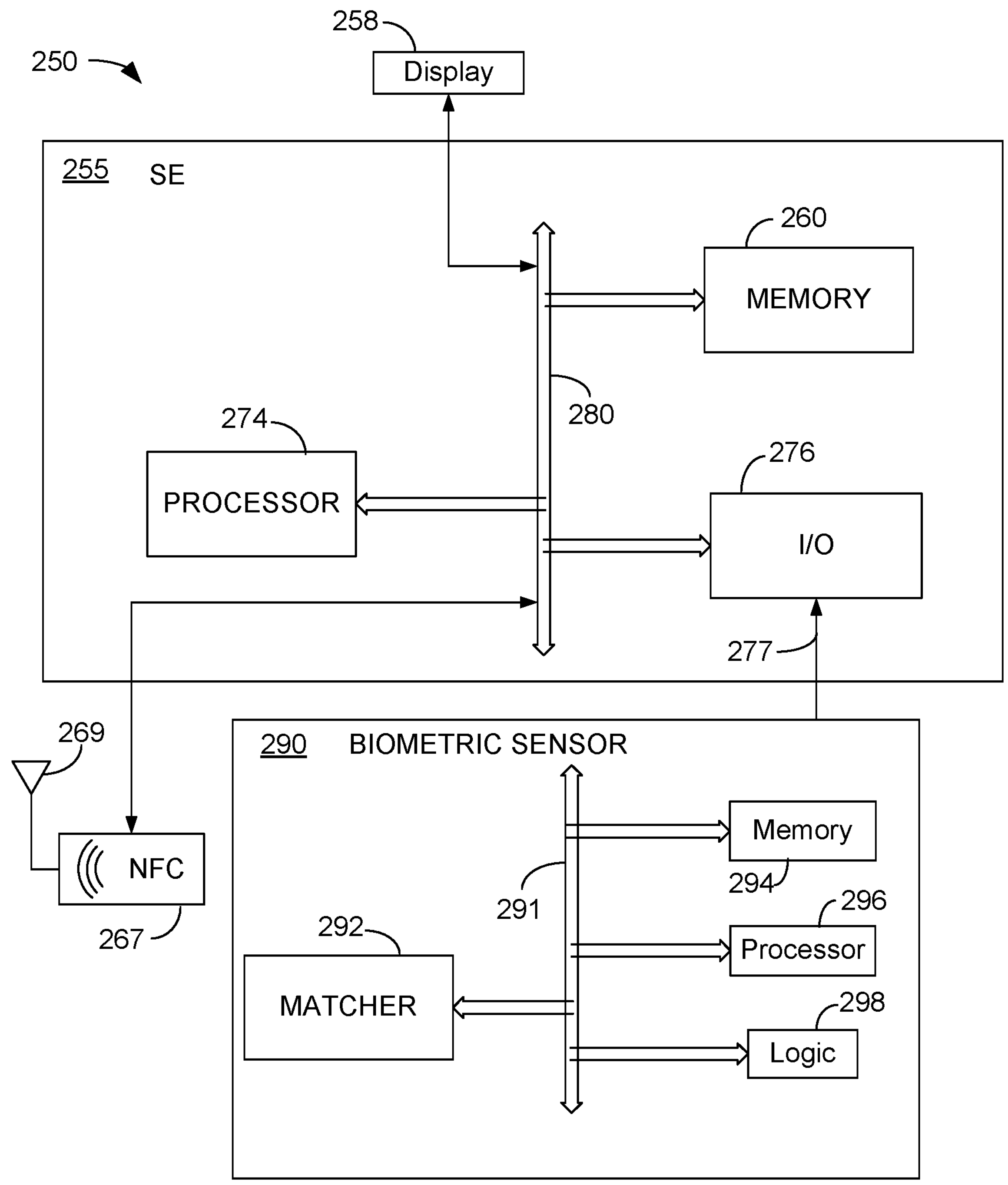
FIG. 2B illustrates an alternative exemplary embodiment of a block diagram of a portion of the smart card of FIG. 1.

FIG. 2B is block diagram 250 of an alternative exemplary embodiment of a portion of the smart card of FIG. 1. In an exemplary embodiment, the portion of the smart card may comprise a secure element 255. The secure element 255 may be similar to the secure element 115 of FIG. 1. In an exemplary embodiment, the secure element 255 may comprise a processor 274, a memory 260 and an I/O element 276 operatively coupled together over a communication bus 280. In an exemplary embodiment, a biometric sensor 290 may include a memory 294, a processor 296, logic 298 and a matcher 292. In an exemplary embodiment, the biometric sensor 290 may provide data to the I/O element 276 over connection 277. In an exemplary embodiment, the biometric sensor 290 may be a fingerprint sensor, similar to the biometric sensor 102 of FIG. 1. In an exemplary embodiment, the memory 260 may be similar to the memory 112 or the memory 132 of FIG. 1.

In an exemplary embodiment, the matcher 292 may be hardware, software, firmware, or a combination thereof, and may be configured to process samples from the biometric sensor 290 to determine whether a biometric sample provided by the biometric sensor 290 has a sufficient number of correlated features with (and/or matches or partially matches) a trusted biometric sample that may be stored in the memory 260 to allow the determination that the new or live biometric sample provided by the biometric sensor 290 belongs to the same user as does the trusted biometric sample.

In an exemplary embodiment, an NFC element 267 and antenna 269 may be connected to the SE 255 to allow the smart card (not shown) that is associated with the SE 255 to harvest power wirelessly. The NFC element 267 and the antenna 269 are similar to the NFC element 117 and antenna 119 described in FIG. 1.

In an exemplary embodiment, a display 258 may be connected to the SE 255 or to another processing element outside of the SE 255, to provide a display to a user. In an exemplary embodiment, the display 258 may be similar to the display 118 described in FIG. 1. In an exemplary embodiment, the processor 274 and the NFC element 267 may be configured to determine signal strength and the display 258 may be used as a signal strength indicator to display NFC signal strength to a user.

Figure 3:
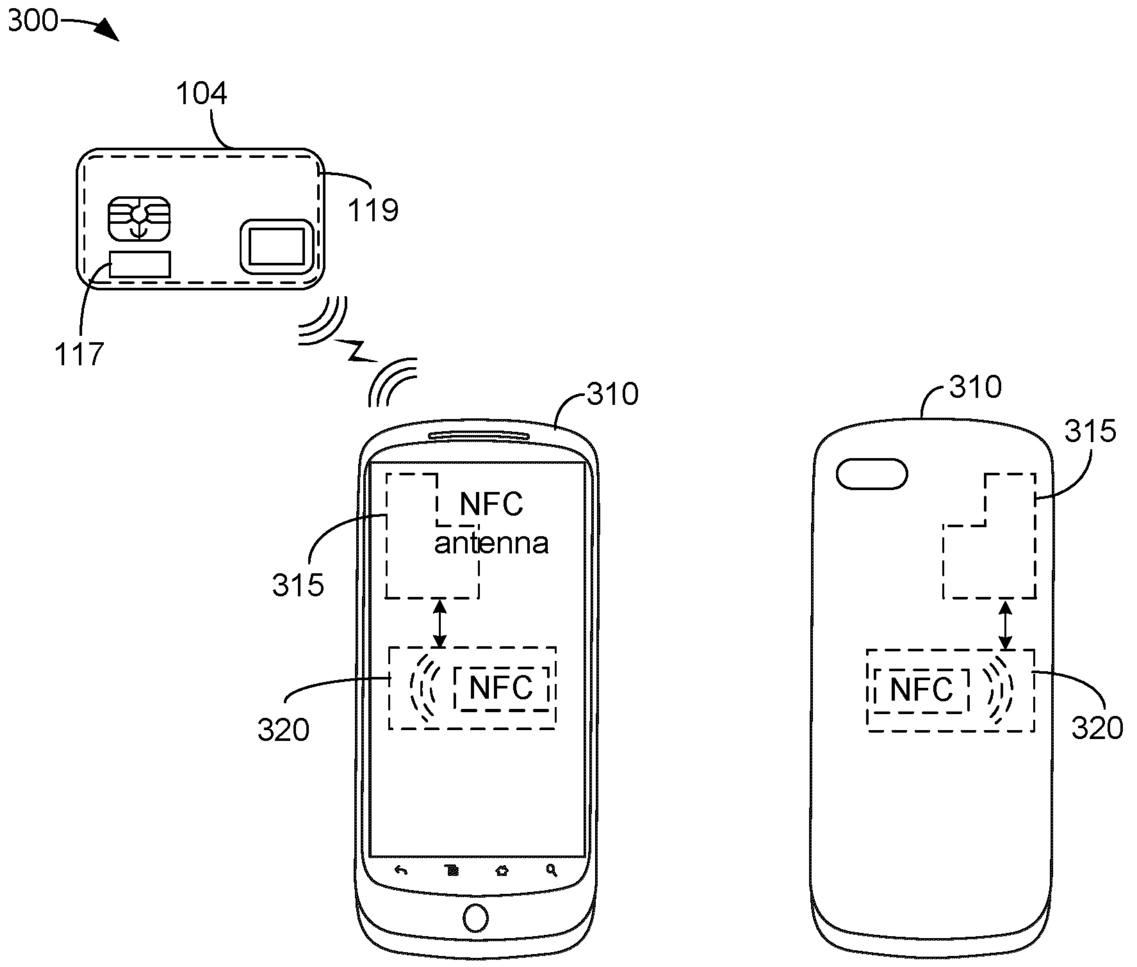
FIG. 3 is a diagram showing an exemplary smart phone having NFC capability.

FIG. 3 is a diagram 300 showing an exemplary host device having NFC capability. In an exemplary embodiment, the host device will be embodied as a smart phone 310; however, other examples of host devices, such as a tablet, a POS terminal, any terminal that may provide NFC communication, etc., are also contemplated and will interchangeably function as a host device. In an exemplary embodiment, the smart phone 310 may comprise an NFC element 320 and a host NFC antenna 315. Although shown as generally having an irregular shape the host NFC antenna 315 may take other shapes and configurations. The host NFC antenna 315 may comprise metal, or metallic material, and may comprise one or more loops, or may have a meandering configuration. Other elements in the smart phone 310 are omitted from this description as they are known to those having ordinary skill in the art.

An exemplary smart card 104 is also shown in FIG. 3. The smart card 104 may be in wireless communication with the smart phone 310, and in an exemplary embodiment, the smart card 104 may harvest power from the smart phone 310 using NFC technology as described herein. However, in some instances, the exemplary distance shown in FIG. 3 between the smart phone 310 and the smart card 104 may be too great to provide sufficient power for some operations. In such instances, it may be desirable to more closely align, or otherwise optimally position or locate the antenna 119 on the smart card 104 with the host NFC antenna 315 to maximize power transfer between the smart phone 310 and the smart card 104.

Figure 4:
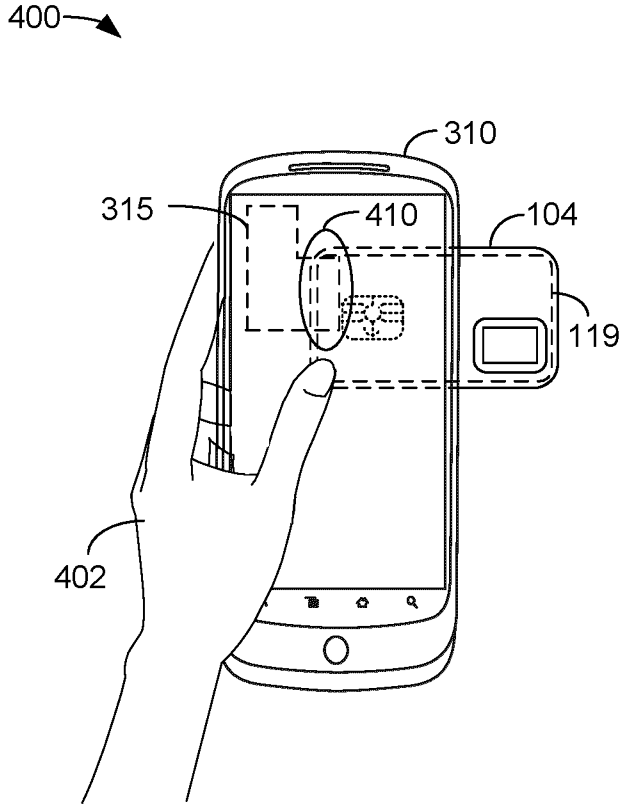
FIG. 4 is a diagram showing alignment difficulty between an exemplary smart phone having NFC capability and a smart card.

FIG. 4 is a diagram 400 showing alignment difficulty between an exemplary smart phone having NFC capability and a smart card. In FIG. 4, a user 402 is depicted as attempting to align a smart card 104 to the back of a smart phone 310 so that the antenna 119 on the smart card 104 aligns with the host NFC antenna 315 sufficiently accurately to allow maximum power transfer from the smart phone 310 to the smart card 104. However, such alignment is difficult to achieve and maintain for a sufficiently long period of time to provide sufficient power transfer for some tasks, such as enrollment, or other time consuming tasks. In some embodiments, it may be difficult to align the antenna 119 on the smart card 104 with the host NFC antenna 315 to complete even a "brief-touch" or a "tap" type of transaction. In FIG. 4, an exemplary antenna overlap area 410 is shown for example purposes. Unless the antenna overlap area 410 is sufficiently large and maintained for a sufficient period of time, then sufficient and constant power transfer may not be possible between the smart phone 310 and the smart card 104.

Figure 5A:
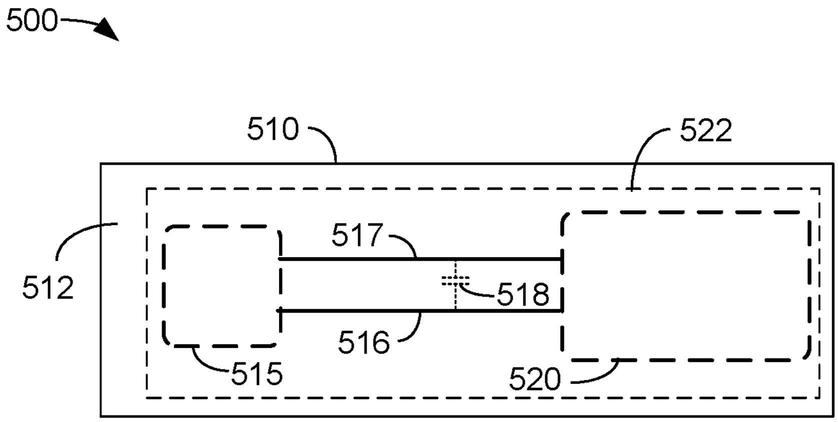
FIG. 5A is a diagram showing an exemplary embodiment of an antenna extender in accordance with the disclosure.

FIG. 5A is a diagram 500 showing an exemplary embodiment of an antenna extender 510 in accordance with the disclosure. In an exemplary embodiment, an antenna extender 510 may include a body 512, a host antenna 515, a card antenna 520, and interconnects 516 and 517. In an exemplary embodiment, the body 512 may comprise any of a rigid, a semi-rigid, a flexible, or other material to form a supporting structure. In other embodiments, the body 512 may range from flexible to rigid and in some embodiments, may be formed of paper or other foldable material.

In some embodiments, the host antenna 515 and the card antenna 520 may be formed using metallic or semi-metallic conductive material. In some embodiments, the host antenna 515 and the card antenna 520 may be formed using printed conductive ink, or other electrically conductive materials.

In some embodiments, the antenna extender 510 may also include an optional resonance element 518, which is illustrated in broken line to indicate that it is optional. In some embodiments, the optional resonance element 518 may be capacitance configured to influence the resonance between the host antenna 515 and the card antenna 520. In other embodiments, the resonance element may comprise the interconnects 516 and 517 and may not include the optional capacitance as the resonance element 518. Although shown as generally having a rectangular shape the host antenna 515 may take other shapes and configurations. The host antenna 515 may comprise metal, or metallic material, and may comprise one or more loops, or may have a meandering configuration. In an exemplary embodiment, the interconnects 516 and 517 may be electrical connections, such as wires or other electrical conductors, and the resonance element 518 may be a capacitance configured to influence the resonance between the host antenna 515 and the card antenna 520. In an exemplary embodiment, the resonance frequency (fres) may be defined by the following formula:

$$fres = 1/2\pi\sqrt{LC}$$

where L=total inductance of the antenna, and C=total capacitance.

In an exemplary embodiment, the resonance of the system that comprises the host antenna 515, the card antenna 520 and the interconnects 516 and 517 can be influenced by one or more of the electrical characteristics of the interconnects 516 and 517 and/or the resonance element 518. The resonance of the system that comprises the host antenna 515, the card antenna 520 and the interconnects 516 and 517 influences the power transfer between the host device and the smart card.

Although shown as generally having a rectangular shape the card antenna 520 may take other shapes and configurations. The card antenna 520 may comprise metal, or metallic material, printed conductive ink, or other material, and may comprise one or more loops, or may have a meandering configuration. In an exemplary embodiment, the card antenna 520 may have a shape that is similar to the shape of the antenna 119 on the smart card 104 to maximize inductive electrical coupling between the card antenna 520 and the antenna 119 on the smart card 104. In an optional exemplary embodiment, a ferrite sheet 522 may be included in the body 512 on either side of the host antenna 515, interconnects 516/517, resonance element 518 and the card antenna 520. The ferrite sheet 522 is depicted in broken like to indicate that it is optional. While shown as having a rectangular shape, the antenna extender 510 may take other shapes and configurations. In some embodiments, an antenna extender may be built in to, or be part of, another object.

Figure 5B:
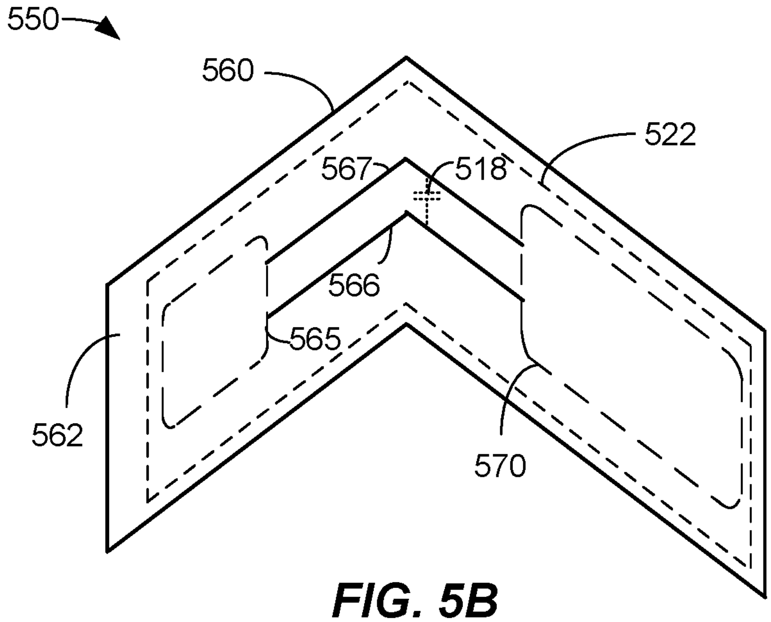
FIG. 5B is a diagram showing an exemplary embodiment of an antenna extender in accordance with the disclosure.

FIG. 5B is a diagram 550 showing an exemplary embodiment of an antenna extender 560 in accordance with the disclosure. In an exemplary embodiment, an antenna extender 560 may include a body 562, a host antenna 565, a card antenna 570, and interconnects 566 and 567. In an exemplary embodiment, the body 562 may comprise a flexible material such as paper to form a supporting structure.

In an exemplary embodiment, the host antenna 565, the card antenna 570, and the interconnects 566 and 567 may be formed of conductive ink printed on the material of the body 562 and may allow the antenna extender 560 to be partially or completely folded as shown in FIG. 5B. For example, the antenna extender 560 may be folded and placed in an envelope for mailing to a user.

Figure 6:
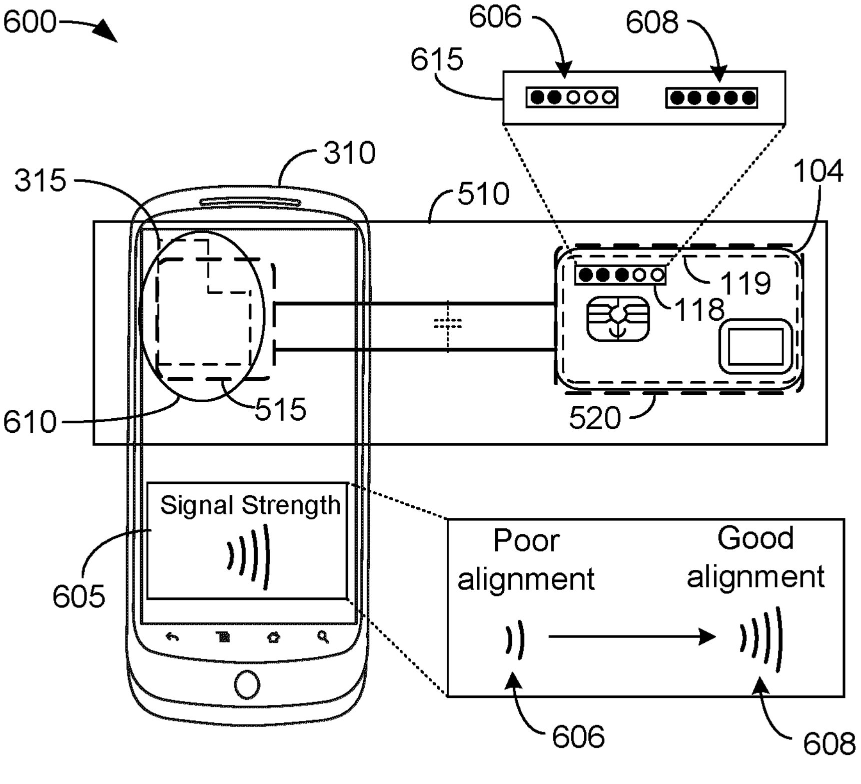
FIG. 6 is a diagram showing alignment between an exemplary smart phone having NFC capability and a smart card using the antenna extender of FIG. 5A.

FIG. 6 is a diagram 600 showing alignment between an exemplary smart phone having NFC capability and a smart card using the antenna extender of FIG. 5A. In an exemplary embodiment, the antenna extender 510 simplifies and eases energy coupling between the host device (the smart phone 310) and a smart card 104. Specifically, the antenna extender 510 simplifies the alignment between the host NFC antenna 315 on the smart phone 310 and the host antenna 515 on the antenna extender 510. Similarly, the antenna extender 510 simplifies the alignment between the antenna 119 on the smart card 104 and the card antenna 520 on the antenna extender 510. In an exemplary embodiment, the antenna overlap area 610 between the host NFC antenna 315 and the host antenna 515 can be maximized because the host antenna 515 can be fabricated to be closer in size and configuration to the host NFC antenna 315 on the smart phone 310. Similarly, the card antenna 520 can be fabricated to be closer in size and configuration to the antenna 119 on the smart card 104. In this manner, the coupling of electromagnetic energy between the host antenna 515 and the host NFC antenna 315 can be maximized; and the coupling of electromagnetic energy between the card antenna 520 and the antenna 119 on the smart card 104 can be maximized. Further, the antenna extender 510 allows the smart card 104 to be spaced away from the smart phone 310, thus further easing alignment between the smart card 104 and the smart phone 310 and facilitating a longer period of time that the smart card 104 can optimally harvest wireless power from the smart phone 310. In an exemplary embodiment, the antenna extender 510 may be configured to receive a smart card 104 in the area of the card antenna 520 to align the antenna 119 on the smart card 104 with the card antenna 520.

In an exemplary embodiment, the smart phone 310 may include a signal strength indicator 605 that can aid in locating the antenna extender 510 with the smart phone 310 and the smart card 104. For example, the signal strength indicator 605 can be built in to the smart phone 310, or may be an application ("app") than can be installed on the smart phone 310. Alternatively, or additionally, the smart card 104 may be configured with NFC signal strength determination capability and may be configured to include a signal strength indicator 615. In an exemplary embodiment, the smart card 104 may use the logic 232, the processor 224, the memory 210 to determine a signal strength related to the positioning of the smart card 104 in proximity to the card antenna 520 and the positioning of the host antenna 515 to the host NFC antenna 315, and may use the display 118 as an indicator of NFC signal strength to provide an indication of wireless power transfer from the smart phone 310 to the smart card 104. For example, as the orientation of the antenna extender 510 changes in relation to the smart phone 310 and the smart card 104, the signal strength indicator 605 and/or the signal strength indicator 615 can indicate a range of signal quality resulting from poor alignment 606 to good alignment 608.

Figure 7:
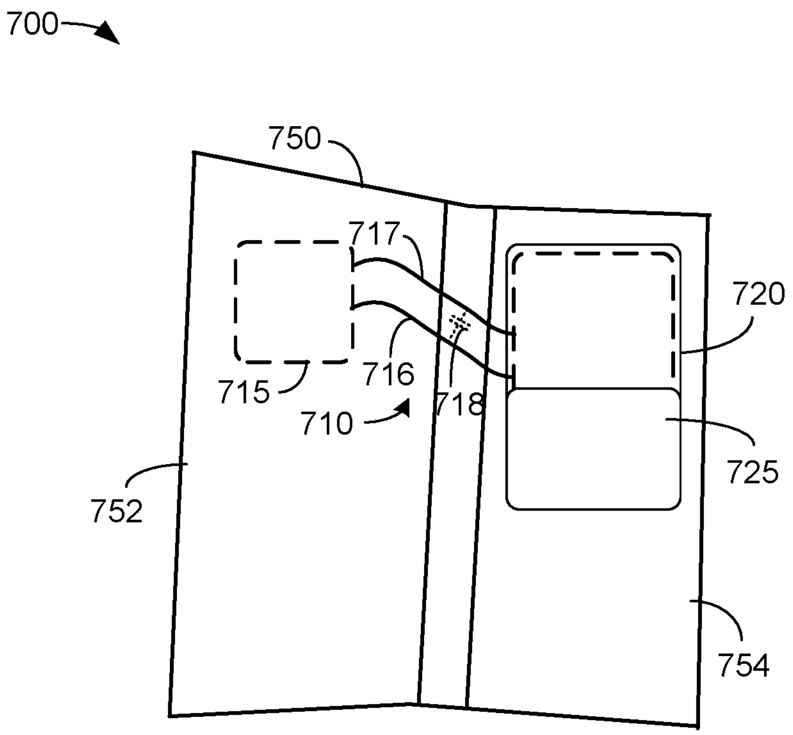
FIG. 7 is a diagram showing another exemplary embodiment of an antenna extender in accordance with the disclosure.

FIG. 7 is a diagram 700 showing another exemplary embodiment of an antenna extender in accordance with the disclosure. In an exemplary embodiment, an antenna extender 710 can be associated with, fabricated as part of, or can be otherwise associated with a case 750 for a host device. In an exemplary embodiment, the antenna extender 710 may be similar to the antenna extender 510 described herein, and details of the antenna extender 710 will not be repeated. In the example shown in FIG. 7, the case 750 may be a case for a smart phone. A host antenna 715 may be fabricated on one side 752 of the case 750 and a card antenna 720 may be fabricated on another side 754 of the case 750. In an exemplary embodiment, a card receptacle (also referred to as a card sleeve) 725 may be located on the case 750 to facilitate locating a smart card 104 (not shown in FIG. 7) in proper orientation with respect to the card antenna 720.

Figure 8:
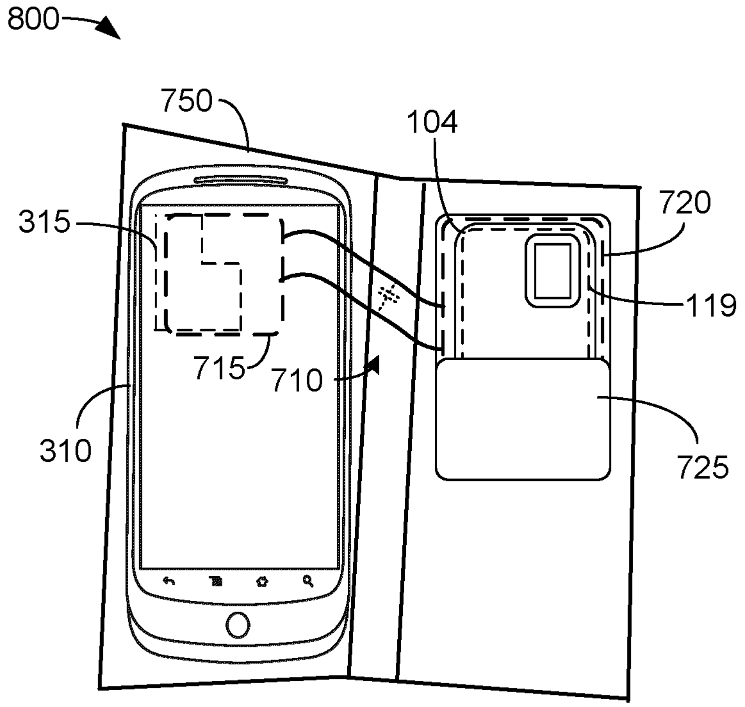
FIG. 8 is a diagram showing an exemplary use of the antenna extender of FIG. 7.

FIG. 8 is a diagram 800 showing an exemplary use of the antenna extender 710 of FIG. 7. In an exemplary embodiment, a smart phone 310 may be placed in the case 750 so that the host NFC antenna 315 in the smart phone 310 is located proximate to the host antenna 715 so that inductive electrical coupling between the host NFC antenna 315 on the smart phone 310 and the host antenna 715 on the antenna extender 710 is maximized. The antenna extender 710 and/or the case 750 may also comprise the card sleeve 725 configured to receive a smart card 104 and aid in aligning the antenna 119 on the smart card 104 with the card antenna 720. A smart card 104 is shown in FIG. 8 as being located in the card sleeve 725 so that the antenna 119 on the smart card 104 is aligned proximate to the card antenna 720.

Figure 9A:
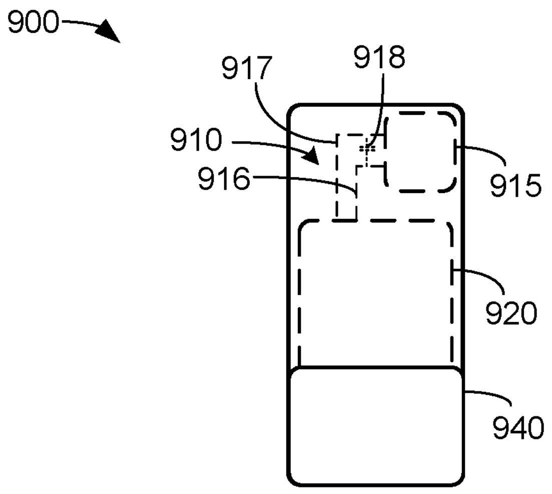
FIG. 9A is a diagram showing another exemplary embodiment of an antenna extender in accordance with the disclosure.

FIG. 9A is a diagram 900 showing another exemplary embodiment of an antenna extender in accordance with the disclosure. In an exemplary embodiment, an antenna extender 910 may comprise, or be fabricated as part of, a card receptacle 940, which may include the host antenna 915, card antenna 920, interconnects 916 and 917, and an optional resonance element 918. In an exemplary embodiment, the antenna extender 910 may be similar to the antenna extender 510 described herein, and details of the antenna extender 910 will not be repeated. In an exemplary embodiment, the card receptacle 940 having the antenna extender 910 may be configured to be attached directly to a host device, such as a smart phone, or may be configured to be attached to, or otherwise incorporated into a case that may house the host device or smart phone.

Figure 9B:
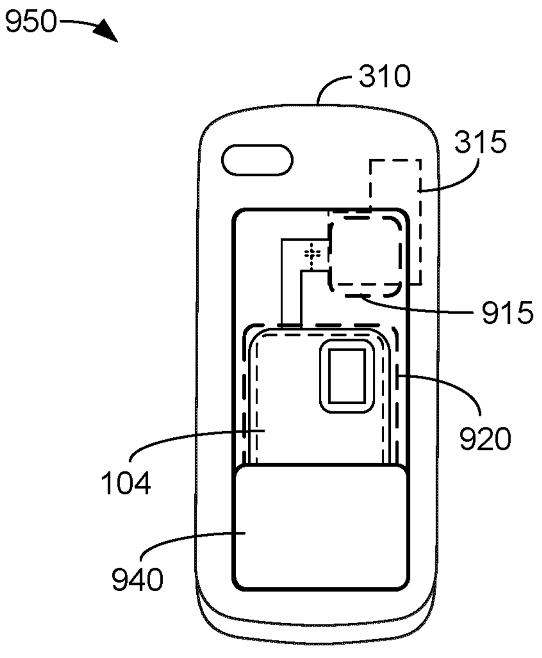
FIG. 9B is a diagram showing an exemplary use of the antenna extender of FIG. 9A.

FIG. 9B is a diagram 950 showing an exemplary use of the antenna extender 910 of FIG. 9A. In an exemplary embodiment, the card receptacle 940 having the antenna extender 910 is shown in FIG. 9B as being located on a smart phone 310. In this manner, a smart card 104 can be inserted into the card receptacle 940 so that the antenna 119 on the smart card 104 properly aligns with the card antenna 920 in the card receptacle 940. Further, the card receptacle 940 can be adhesively attached to the rear of the smart phone 310, or to a smart phone case, or other host device or host device case, so that the host NFC antenna 315 on the smart phone 310 properly aligns with the host antenna 915 on the antenna extender 910.

Figure 10A:
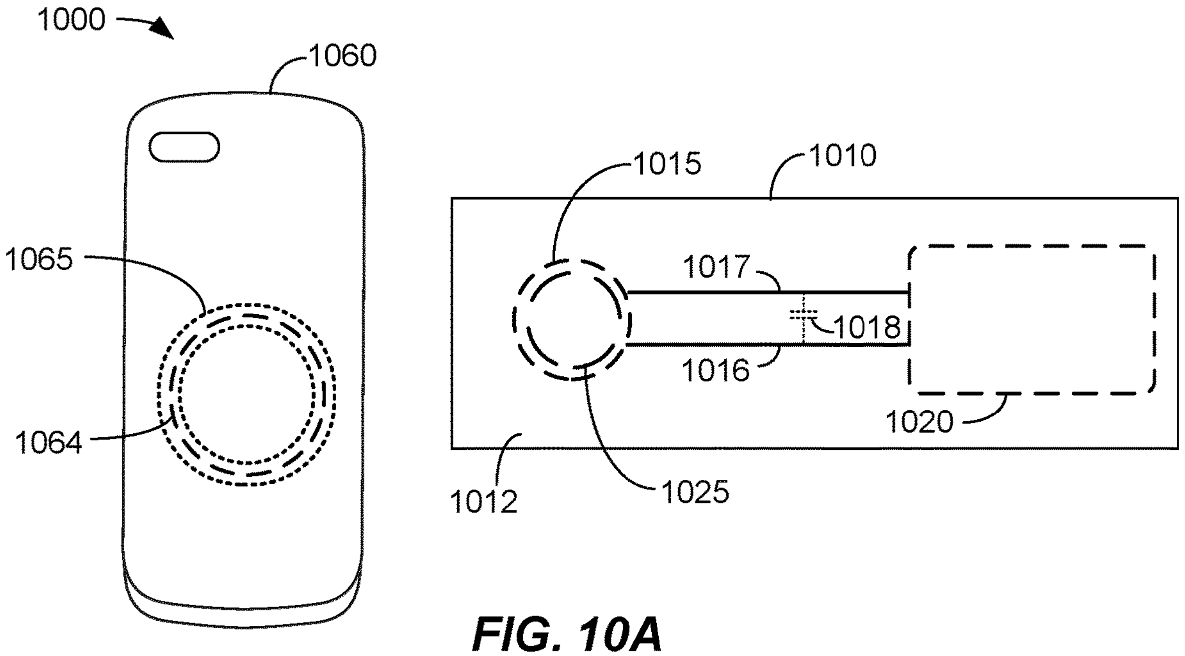
FIG. 10A is a diagram showing another exemplary embodiment of an antenna extender in accordance with the disclosure.

FIG. 10A is a diagram 1000 showing another exemplary embodiment of an antenna extender in accordance with the disclosure.

In an exemplary embodiment, an antenna extender 1010 may include a body 1012, a host antenna 1015, a card antenna 1020, interconnects 1016 and 1017, and an optional resonance element 1018. In an exemplary embodiment, the antenna extender 1010 may be similar to the antenna extender 510 described herein, and details of the antenna extender 1010 will not be repeated. Although shown as generally having a rectangular shape the host antenna 1015 may take other shapes and configurations. The host antenna 1015 may comprise metal, or metallic material, and may comprise one or more loops, or may have a meandering configuration. Although shown as generally having a rectangular shape the card antenna 1020 may take other shapes and configurations. The card antenna 1020 may comprise metal, or metallic material, and may comprise one or more loops, or may have a meandering configuration. In an exemplary embodiment, the card antenna 1020 may have a shape that is similar to the shape of the antenna 119 on the smart card 104 to maximize inductive electrical coupling between the card antenna 1020 and the antenna 119 on the smart card 104. In an exemplary embodiment, the interconnects 1016 and 1017 may be electrical connections, such as wires or other electrical conductors, and the optional resonance element 1018 may be a capacitance configured to influence the resonance between the host antenna 1015 and the card antenna 1020. In an exemplary embodiment, the antenna extender 1010 may comprise a magnet or magnetic material 1025. In an exemplary embodiment, a magnet 1025 will be described herein; however, the description below applies to magnetic material as well.

In an exemplary embodiment, a host device, which can be a smart phone 1060 in this exemplary embodiment, may include a host NFC antenna 1064 and may include a magnet region 1065. The magnet region 1065 may comprise a magnet or magnetic material. Although shown in FIG. 10A as the magnet region 1065 being co-centered with the host NFC antenna 1064, in some embodiments, the magnet region 1065 may not be co-centered, or co-located, with the host NFC antenna 1064. For example, even though the magnet region 1065 may be located as shown in FIG. 10A, the host NFC antenna 1064 may be located elsewhere on the smart phone 1060.

Figure 10B:
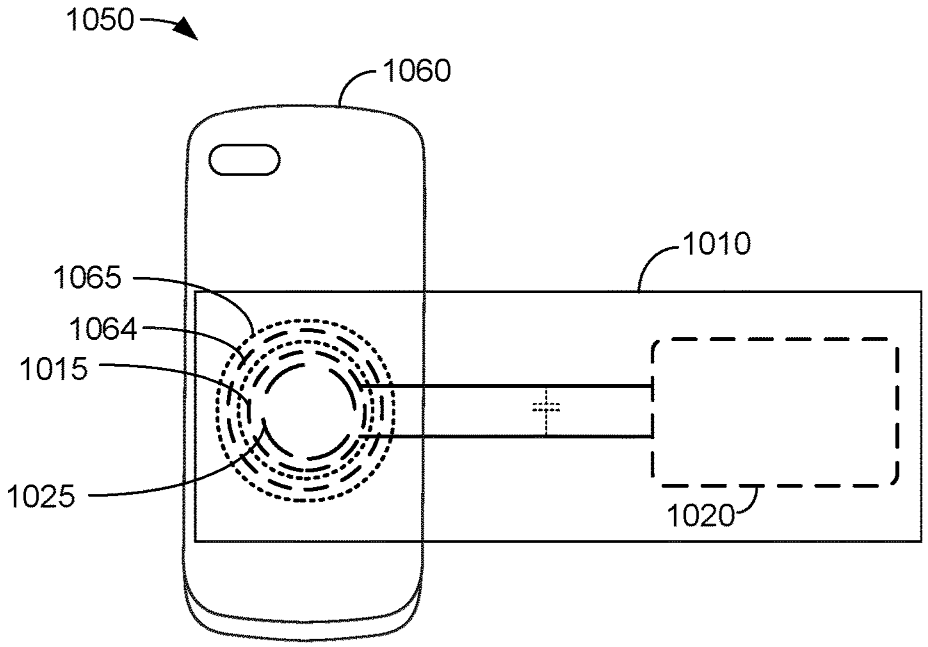
FIG. 10B is a diagram showing an exemplary use of the antenna extender of FIG. 10A.

FIG. 10B is a diagram 1050 showing an exemplary use of the antenna extender 1010 of FIG. 10A. In the example shown in FIG. 10B, the antenna extender 1010 is magnetically attached to the smart phone 1060 whereby the magnet 1025 (or magnetic material) on the antenna extender 1010 is magnetically connected to the magnet region 1065 on the smart phone 1060. In this manner, the host antenna 1015 on the antenna extender 1010 is located in proper alignment with the host NFC antenna 1064 so as to maximize the inductive electrical coupling between the host antenna 1015 and the host NFC antenna 1064. In an exemplary embodiment, the antenna extender 1010 may be specific to a particular host device, so that the magnet or magnetic material 1025 may be located to align with the magnet region 1065. In other embodiments, the magnet or magnetic material 1025 may be used as a positioning or locating aid to define an optimum position of the antenna extender 1010 relative to the smart phone 1060, regardless of the location of the host NFC antenna 1064 on the smart phone 1060.

Figure 11A:
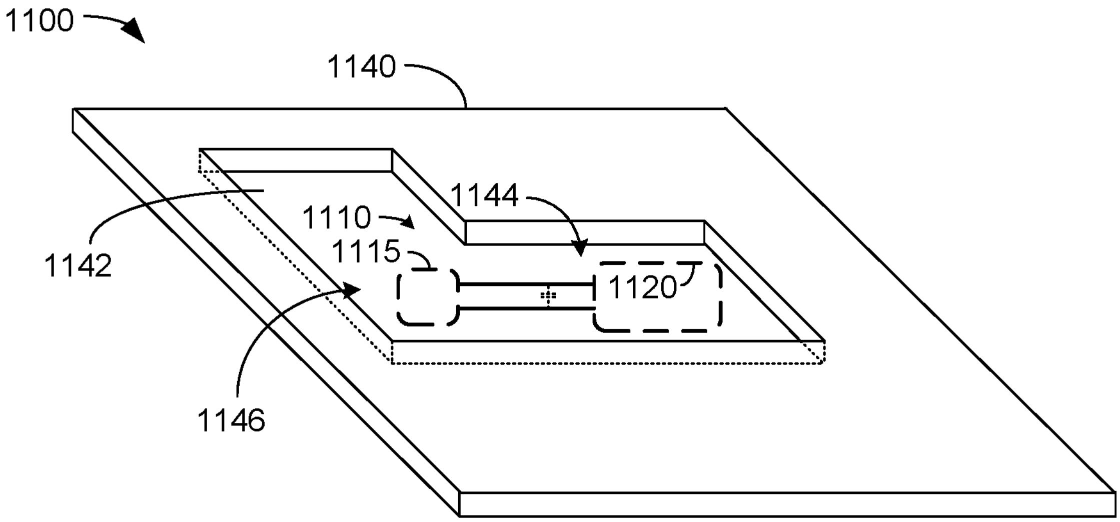
FIG. 11A is a diagram showing another exemplary embodiment of an antenna extender in accordance with the disclosure.

FIG. 11A is a diagram 1100 showing another exemplary embodiment of an antenna extender in accordance with the disclosure. In an exemplary embodiment, an antenna extender 1110 may be located in, fabricated as part of, or may otherwise be associated with a housing 1140. In an exemplary embodiment, the antenna extender 1110 may be similar to the antenna extender 510 described herein, and details of the antenna extender 1110 will not be repeated. In an exemplary embodiment, the antenna extender may be located in a recess 1142 in the housing 1140. In an exemplary embodiment, the recess 1142 may include one or more locating regions, such as locating regions 1144 and 1146. In an exemplary embodiment, a locating region 1144 may be configured to accept a smart card 104 (not shown) and the locating region 1146 may be configured to accept a host device, such as a smart phone 310 (not shown).

Figure 11B:
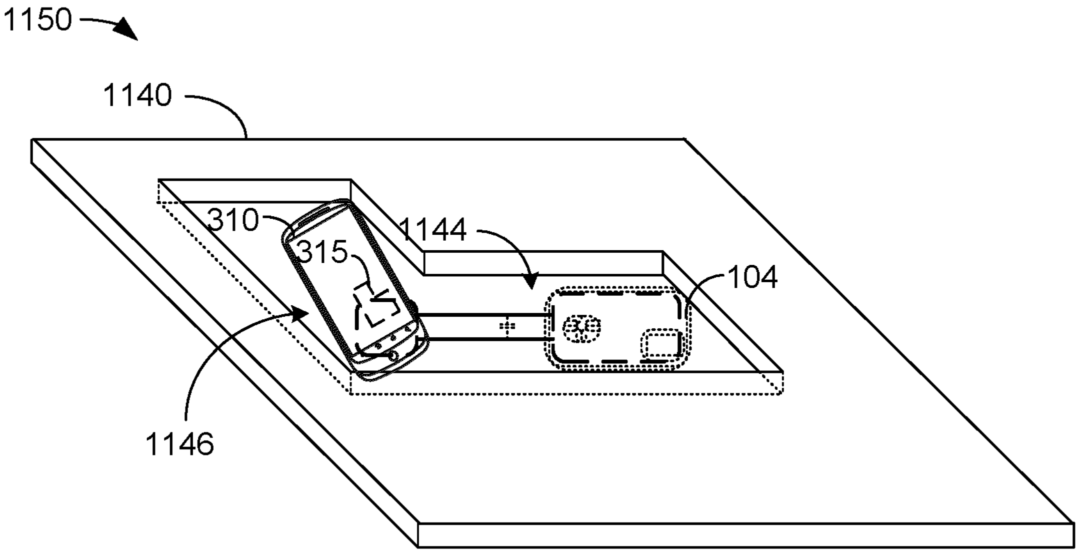
FIG. 11B is a diagram showing an exemplary use of the antenna extender of FIG. 11A.

FIG. 11B is a diagram 1150 showing an exemplary use of the antenna extender of FIG. 11A. In an exemplary embodiment, a smart phone 310 may be placed in the locating region 1146, and a smart card 104 may be placed in the locating region 1144.

Figure 11C:
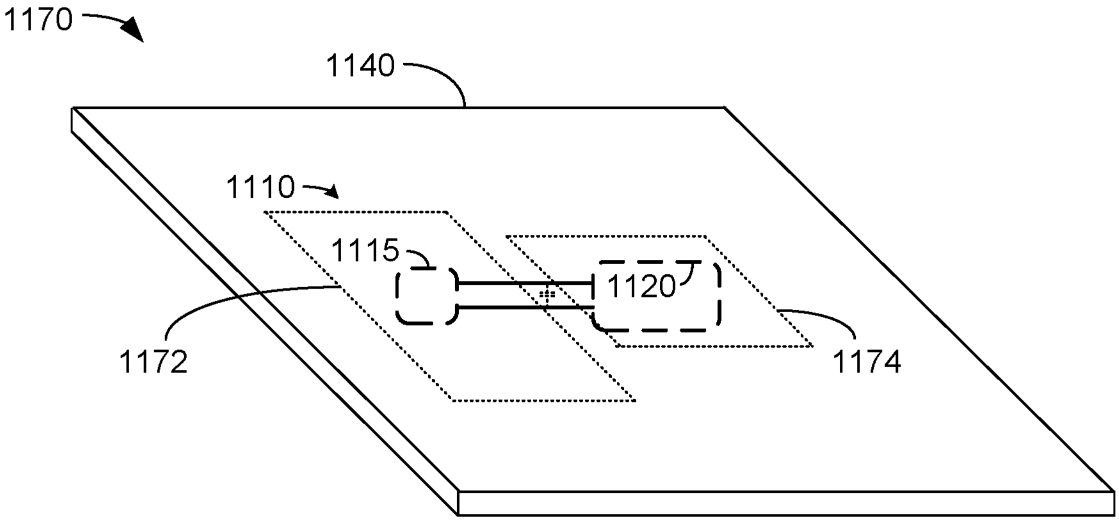
FIG. 11C is a diagram showing another exemplary embodiment of an antenna extender in accordance with the disclosure.

FIG. 11C is a diagram 1170 showing another exemplary embodiment of an antenna extender in accordance with the disclosure. In an exemplary embodiment, an antenna extender 1110 may be located on top of the housing 1140. In an exemplary embodiment, the antenna extender 1110 may be similar to the antenna extender 510 described herein, and details of the antenna extender 1110 will not be repeated. In an exemplary embodiment, the antenna extender may be located on a surface of the housing 1140. In an exemplary embodiment, the housing 1140 may include a marking or indicia 1172 illustrating a location where to place a host device (not shown) so that an NFC on the host device aligns with the antenna 1115 on the antenna extender 1110. In an exemplary embodiment, the housing 1140 may include a marking or indicia 1174 illustrating a location where to place a smart card (not shown) so that an NFC on the smart card aligns with the antenna 1120 on the antenna extender 1110. In some embodiments, the housing 1140 may comprise one or more indicia or "markings" defining the location at which to place one or more different host devices, smart phones, tablet computing devices, etc., depending on phone models or the "touchpoint" of the host devices. In some embodiments, the antenna extender 1110 may be a thin "wallet/sheath/two-third card holder" to slide a smart card in place.

Figure 12A:
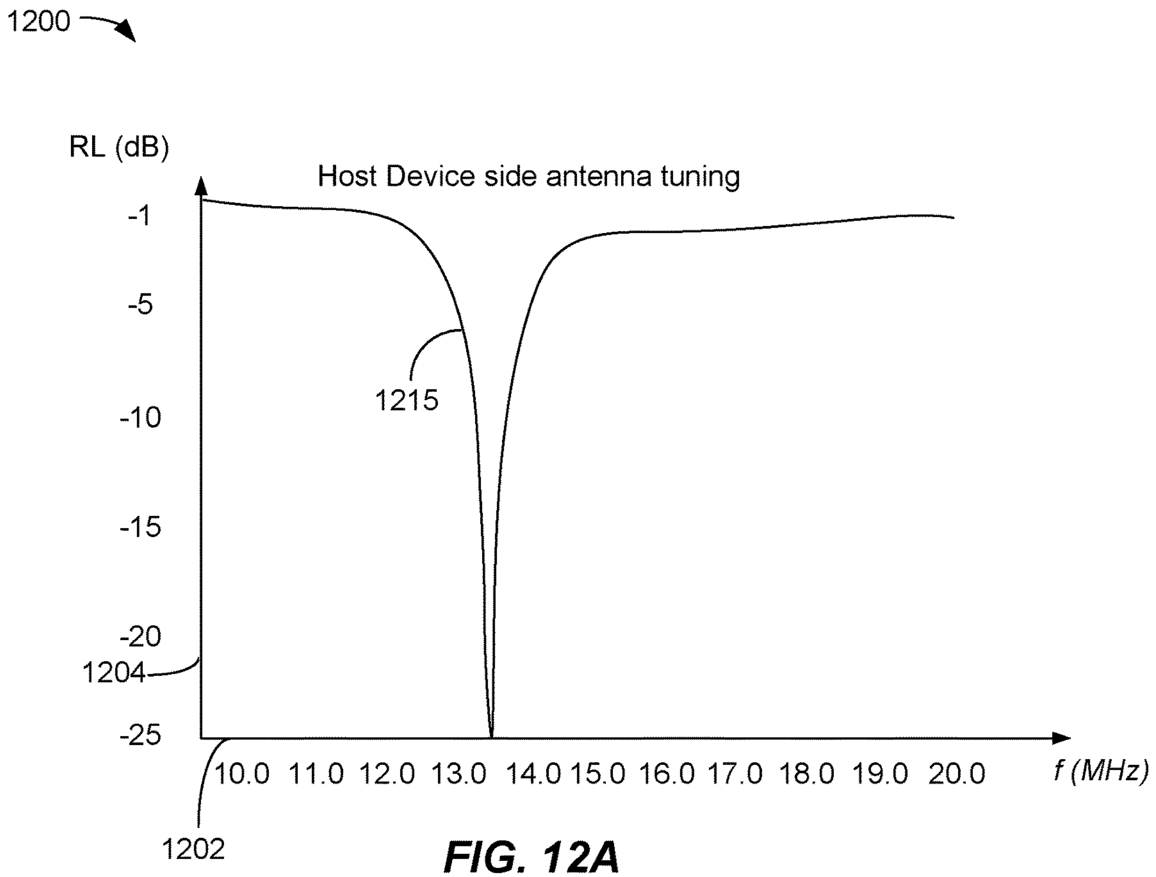
FIG. 12A is a diagram showing exemplary antenna tuning of the host device side antenna of the antenna extender.
Figure 12B:
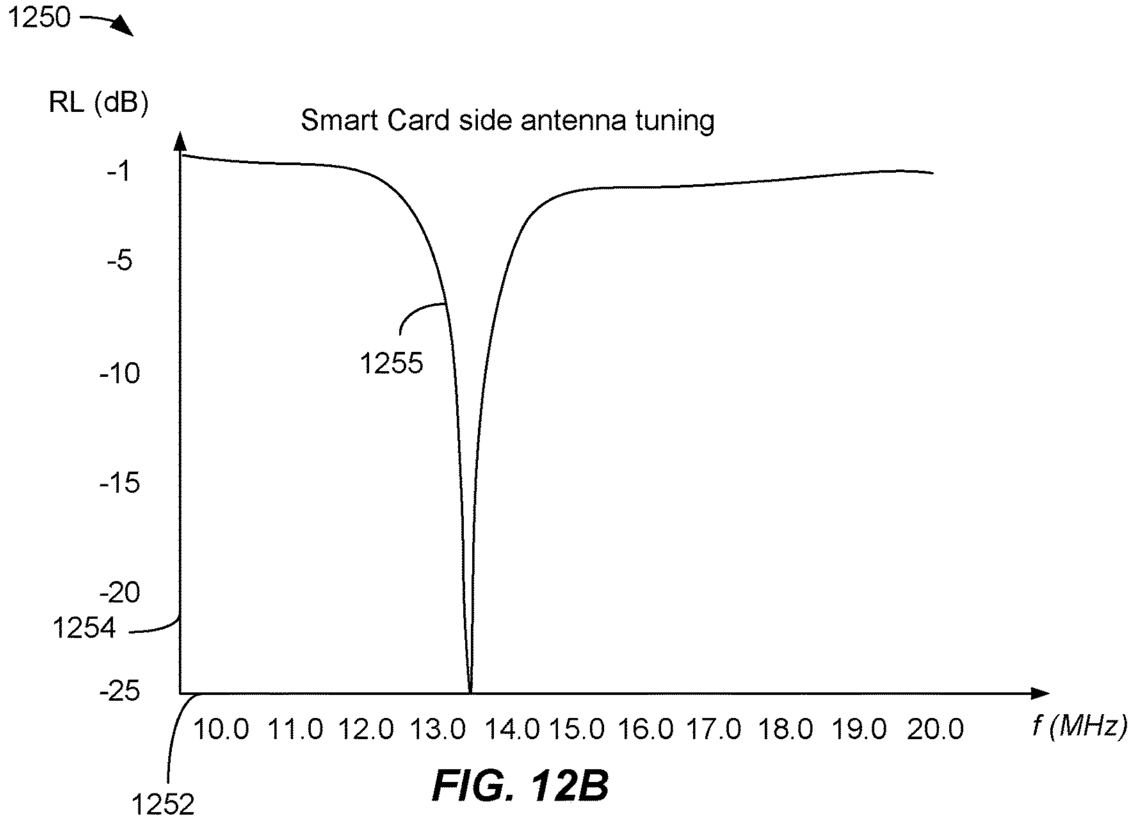
FIG. 12B is a diagram showing exemplary antenna tuning of the smart card side antenna of the antenna extender.

FIG. 12A is a diagram 1200 showing exemplary antenna tuning of the host device side antenna of the antenna extender 510. The horizontal axis 1202 represents frequency in megahertz (MHz), and the vertical axis 1204 represents return loss in dB. In an exemplary embodiment, the notch response indicated by the trace 1215 shows a resonance that reaches a maximum at a nominal frequency of 13.56 MHz, which is the nominal NFC operating frequency. The resonance at a nominal frequency of 13.56 MHz corresponds to a maximum power transfer from a host device to a smart card that occurs, in this example, at a nominal frequency of 13.56 MHz FIG. 12B is a diagram 1250 showing exemplary antenna tuning of the smart card side antenna of the antenna extender 510. The horizontal axis 1252 represents frequency in megahertz (MHz), and the vertical axis 1254 represents return loss in dB. The diagrams 1200 and 1250 illustrate the resonant tuning capability of the antenna extender 510 (or any other exemplary embodiments of the antenna extender) described herein. In an exemplary embodiment, a capacitance value of 56 picoFarads (pF) for the resonance element 518 may lead to a condition where the host antenna 515 (FIG. 12A) and the card antenna 520 (FIG. 12B) achieve the same nominal resonant frequency. In the example shown in FIGS. 12A and 12B, the example resonant frequency may be a nominal frequency of 13.56 MHz. When the host antenna 515 (FIG. 12A) and the card antenna 520 (FIG. 12B) resonate at approximately the same frequency, inductive power transfer between the host antenna 515 (FIG. 12A) and the card antenna 520 (FIG. 12B) may be maximized.

Figure 13:
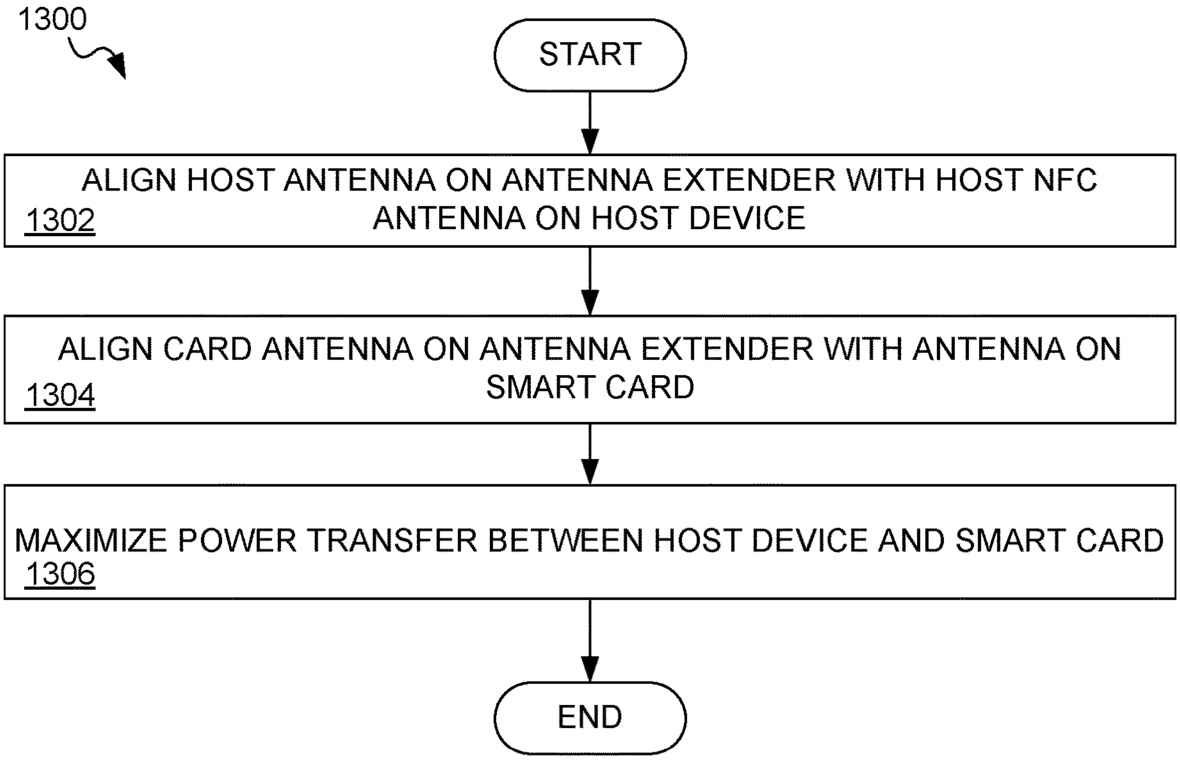
FIG. 13 is a method for aligning a smart card to a host device.

FIG. 13 is a flow chart describing an example of the operation of a method 1300 for maximizing or improving NFC power transfer. The blocks in the method 1300 can be performed in or out of the order shown, and in some embodiments, can be performed at least in part in parallel.

In block 1302, a host antenna on an antenna extender may be aligned with a host NFC antenna on a host device. For example, the host antenna 515 on the antenna extender 510 may be aligned with a host NFC antenna 315 on a smart phone 310.

In block 1304, a card antenna on an antenna extender may be aligned with an antenna on a smart card. For example, the card antenna 520 on the antenna extender 510 may be aligned with the antenna 119 on the smart card 104.

In block 1306, the antenna extender maximizes power transfer between the host device and a smart card. For example, the antenna extender 510 may maximize power transfer between the smart phone 310 and the smart card 104.

Figure 14:
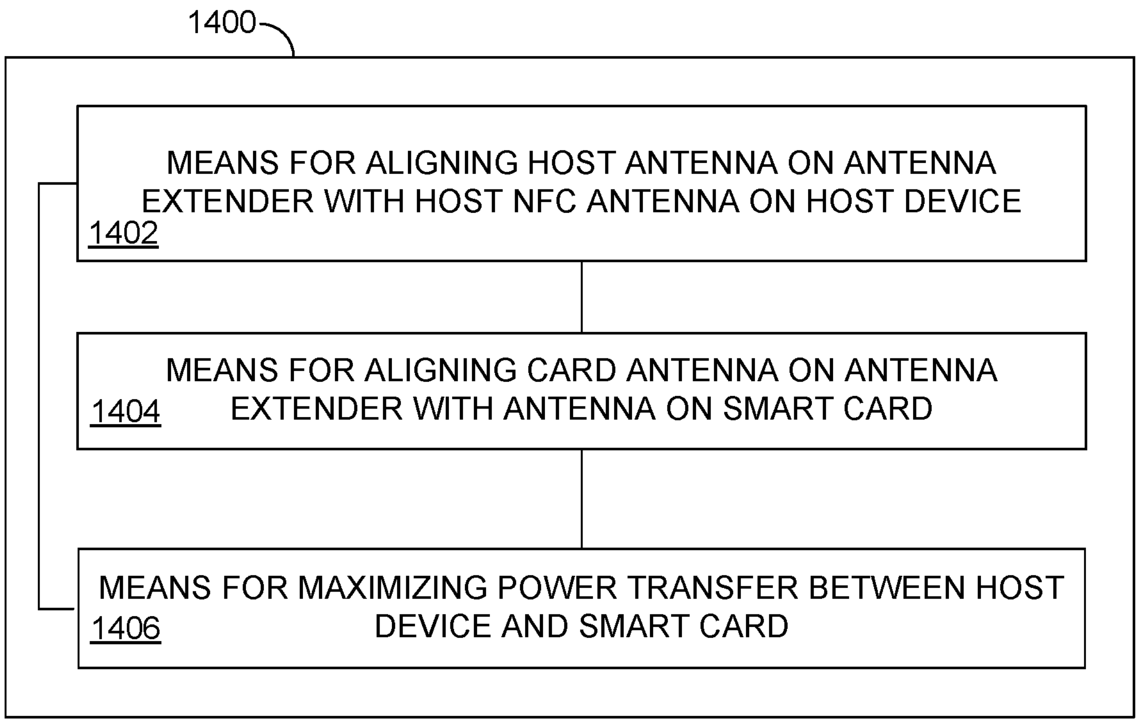
FIG. 14 is an apparatus for aligning a smart card to a host device.

FIG. 14 is a functional block diagram of an apparatus 1400 for maximizing or improving NFC power transfer. The apparatus 1400 comprises means 1402 for aligning a host antenna on an antenna extender with a host NFC antenna on a host device. In certain embodiments, the means 1402 for aligning a host antenna on an antenna extender with a host NFC antenna on a host device can be configured to perform one or more of the functions described in operation block 1302 of method 1300 (FIG. 13). In an exemplary embodiment, the means 1402 for aligning a host antenna on an antenna extender with a host NFC antenna on a host device may comprise the antenna extender 510 facilitating an alignment between a host antenna 515 on the antenna extender 510 with a host NFC antenna 315 on a smart phone 310.

The apparatus 1400 also comprises means 1404 for aligning a card antenna on an antenna extender with an antenna on a smart card. In certain embodiments, the means 1404 for aligning a card antenna on an antenna extender with an antenna on a smart card can be configured to perform one or more of the functions described in operation block 1304 of method 1300 (FIG. 13). In an exemplary embodiment, the means 1404 for aligning a card antenna on an antenna extender with an antenna on a smart card may comprise the antenna extender 510 facilitating an alignment between the card antenna 520 on the antenna extender 510 with the antenna 119 on the smart card.

The apparatus 1400 also comprises means 1406 for maximizing power transfer between the host device and a smart card. In certain embodiments, the means 1406 for maximizing power transfer between the host device and a smart card can be configured to perform one or more of the functions described in operation block 1306 of method 1300 (FIG. 13). In an exemplary embodiment, the means 1406 for maximizing power transfer between the host device and a smart card may comprise the antenna extender 510 maximizing power transfer between the smart phone 310 and the smart card 104.

Implementation examples are described in the following numbered clauses:

1. An antenna extender, comprising: a body having a supporting structure configured to receive a smart card; a first antenna electrically connected to a second antenna, the first antenna configured to inductively couple with a near field communication (NFC) antenna on a host device, the second antenna configured to inductively couple with an NFC antenna on the smart card.

2. The antenna extender of clause 1, wherein the first antenna and the second antenna are tunable in frequency.

3. The antenna extender of any of clauses 1 through 2, wherein the first antenna and the second antenna are different sizes.

4. The antenna extender of clause 2, wherein the first antenna and the second antenna are resonantly tuned using a passive component.

5. The antenna extender of any of clauses 1 through 4, wherein the body is integrated with a device case.

6. The antenna extender of any of clauses 1 through 5, wherein the body is integrated with a receptacle configured to align the NFC antenna on the smart card with the second antenna.

7. The antenna extender of any of clauses 1 through 6, wherein the receptacle is configured to be releasably attached to the host device.

8. The antenna extender of any of clauses 1 through 7, further comprising a magnet or a magnetic material proximate to the first antenna.

9. The antenna extender of any of clauses 1 through 8, wherein the host device comprises a magnet or magnetic material configured to align with the magnet or magnetic material associated with the first antenna.

10. The antenna extender of any of clauses 1 through 9, wherein the supporting structure is located in a housing having a recess configured to receive the smart card and the host device.

11. The antenna extender of any of clauses 1 through 10, wherein the antenna extender is configured to provide NFC signal energy from the host device to the smart card, and one or more of the host device and the smart card comprise an NFC signal strength indicator.

12. The antenna extender of any of clauses 1 through 10, wherein the supporting structure is flexible and the first antenna and the second antenna are printed conductive ink.

13. A method for improving power transfer between a smart card and a host device, comprising: aligning a first antenna on a first side of an antenna extender in proximity to a host NFC antenna on a host device; aligning a second antenna on a second side of the antenna extender in proximity to an antenna on a smart card; and maximizing power transfer from the host device to the smart card through the antenna extender.

14. The method of clause 13, further comprising tuning a resonant frequency of the first antenna and the second antenna.

15. The method of any of clauses 13 through 14, further comprising tuning a resonant frequency of the first antenna and the second antenna using a passive component.

16. The method of any of clauses 13 through 15, further comprising integrating the antenna extender in a device case.

17. The method of any of clauses 13 through 16, further comprising integrating the antenna extender in a housing.

18. A device for improving power transfer between a smart card and a host device, comprising: means for aligning a first antenna on a first side of an antenna extender in proximity to a host NFC antenna on a host device; means for aligning a second antenna on a second side of the antenna extender in proximity to an antenna on a smart card; and means for maximizing power transfer from the host device to the smart card through the antenna extender.

19. The device of clause 18, further comprising means for tuning a resonant frequency of the first antenna and the second antenna.

20. The device of any of clauses 18 through 19, further comprising means for tuning a resonant frequency of the first antenna and the second antenna using a passive component.

21. The device of any of clauses 18 through 20, further comprising means for integrating the antenna extender in a device case.

22. The device of any of clauses 18 through 21, further comprising means for integrating the antenna extender in a housing.

One or more illustrative or exemplary embodiments of the invention have been described above. However, it is to be understood that the invention is defined by the appended claims and is not limited to the specific embodiments described.

What is claimed is:

1. An antenna extender, comprising:

a body having a first end and a second end;

a first antenna formed on the surface of the first end of the body;

a second antenna formed on the surface of the second end of the body, the first antenna electrically connected to the second antenna via at least one interconnect formed on the surface of the body between the first end of the body and the second end of the body, the first antenna configured to inductively couple with a near field communication (NFC) antenna on a host device when the host device is coupled to the first end of the body, the second antenna configured to inductively couple with an NFC antenna on a smart card when the smart card is coupled to the second end of the body, the antenna extender providing NFC signal energy from the host device to the smart card when the host device is coupled to the first end of the body and the smart card is coupled to the second end of the body.

2. The antenna extender of claim 1, wherein the first antenna and the second antenna are tunable in frequency.

3. The antenna extender of claim 2, wherein the first antenna and the second antenna are resonantly tuned using a passive component coupled to the at least one interconnect.

4. The antenna extender of claim 1, wherein the first antenna and the second antenna are different sizes.

5. The antenna extender of claim 1, wherein the body is integrated with a device case configured to receive the host device.

6. The antenna extender of claim 1, wherein the body is integrated with a receptacle configured to align the NFC antenna on the smart card with the second antenna.

7. The antenna extender of claim 6, wherein the receptacle is configured to be releasably attached to the host device.

8. The antenna extender of claim 1, further comprising a magnet or a magnetic material proximate to the first antenna for magnetically coupling the first end of the body to a magnet or magnetic material on the host device.

9. The antenna extender of claim 8, wherein the magnet or magnetic material associated with the first antenna is configured to align with the magnet or magnetic material on the host device when the host device is coupled to the first end of the body.

10. The antenna extender of claim 1, wherein the body is located in a housing having a recess configured to receive the smart card and the host device.

11. The antenna extender of claim 1, wherein the second antenna has a shape similar to the shape of the NFC antenna on the smart card.

12. The antenna extender of claim 1, wherein the body is flexible and the first antenna and the second antenna are printed conductive ink.

* * * * *